(12) United States Patent
Sandhu et al.

(10) Patent No.: US 11,301,516 B2
(45) Date of Patent: Apr. 12, 2022

(54) CULINARY ITEM SEARCH PLATFORM

(71) Applicant: SeeFood, Inc., Garden Grove, CA (US)

(72) Inventors: Dhillon Singh Sandhu, Garden Grove, CA (US); Francesco Paolo Maggiolino, Rivarossa (IT)

(73) Assignee: SeeFood, Inc., Garden Grove, CA (US)

( * ) Notice: Subject to any disclaimer, the term of this patent is extended or adjusted under 35 U.S.C. 154(b) by 223 days.

(21) Appl. No.: 16/825,536

(22) Filed: Mar. 20, 2020

(65) Prior Publication Data

US 2020/0311144 A1    Oct. 1, 2020

Related U.S. Application Data

(60) Provisional application No. 62/825,588, filed on Mar. 28, 2019.

(51) Int. Cl.
*G06F 16/00* (2019.01)
*G06F 16/9035* (2019.01)
*G06K 9/00* (2022.01)
*G06T 19/00* (2011.01)
*G06F 16/9038* (2019.01)
*G06F 16/432* (2019.01)

(52) U.S. Cl.
CPC ........ *G06F 16/9035* (2019.01); *G06F 16/434* (2019.01); *G06F 16/9038* (2019.01); *G06K 9/0063* (2013.01); *G06T 19/006* (2013.01)

(58) Field of Classification Search
CPC .................................................... G06F 16/434
See application file for complete search history.

(56) References Cited

U.S. PATENT DOCUMENTS

2015/0310310 A1*  10/2015  Hesch ................. G06K 9/6232
                                                382/103

\* cited by examiner

*Primary Examiner* — Ajith Jacob
(74) *Attorney, Agent, or Firm* — Perkins Coie LLP; Brian R. Coleman; Louis Yang

(57) ABSTRACT

The present embodiments relate to a search platform that facilitates a user in searching entities, products and/or services, such as foods or restaurants. The platform can allow for a user to search for food by attributes such as a name of the dish, an ingredient of the dish, or a diet type (e.g., Keto diet). A search result can include a list of dishes available across multiple restaurants. The user can view detailed information about a dish (e.g., ingredients, ingredient the user is allergic to, calories) by selecting an entry in the list. The platform also allows a user to view an augmented-reality (AR) based image of the selected dish, which can be a three-dimensional (3D) image capable of being modified (e.g., turn, pan, zoom in).

25 Claims, 25 Drawing Sheets

CULINARY ITEM SEARCH PLATFORM

CROSS-REFERENCE TO RELATED APPLICATION

This application claims priority to U.S. Patent Application No. 62/825,588, titled "SEARCH PLATFORM FOR FOOD," and filed Mar. 28, 2019, which is incorporated by reference herein by its entirety.

TECHNICAL FIELD

The disclosure is related to a method and apparatus for a search platform for searching entities, products or services, such as culinary items and providers of culinary items.

BACKGROUND

Many search platforms for restaurants, such as a web search engine or a mobile app, allows a user to search for restaurants. The search will typically generate a list of restaurants that match a search criterion, which can be a restaurant name, dish name, cuisine, location etc. The search does not generate a list of dish names even though a name of the dish is used as the search criterion, instead may typically include names of the restaurants that may serve the dish. This can be disadvantageous as the user may not be able to view and/or compare information associated with the desired dish across restaurants. The user may have to select a restaurant from the search list, open their menu and then view information associated with the dish. The user may have to do so for multiple restaurants to compare the information, which is a tedious task and consume a significant amount of computing resources.

Further, in many search platforms, the reviews are typically directed to a restaurant and not for a dish. A consuming user (user interested in a specific dish) may care more about the reviews on the specified dish than the restaurant or may not even care about the reviews on the restaurant. However, the consuming user may not find such reviews on the specified dish in the current search platforms. Even if a reviewer provides comments on a single dish, the comments are included as part of a review of the restaurant and not specifically for the single dish. The consuming user may have to read the entire review to find out if the review included any comments on the desired dish. Even an objective review, such as a star rating (e.g., out of 5 stars), is given for a restaurant and not for a specific dish. The consuming user may not have an accurate way of knowing what people think about a specific dish in the restaurant. Accordingly, many search platforms for restaurants are not useful for finding information about a specific dish.

DETAILED DESCRIPTION

Figure 1:
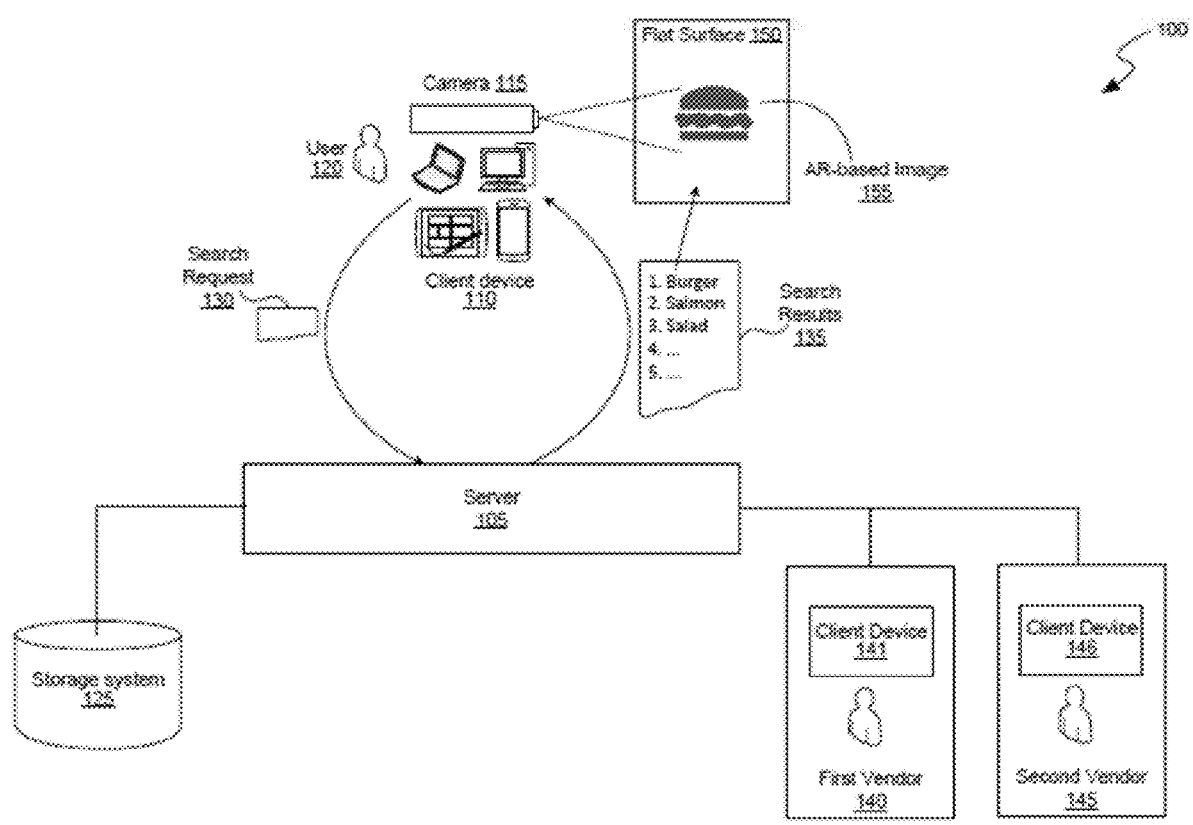
FIG. 1 is a block diagram of an environment 100 in which a search platform can be implemented.

The present embodiments relate to a search platform for searching entities, products and/or services. One example of such a search platform is for searching culinary items (or simply "foods") or culinary item providers (or simply "restaurants"). The search platform can allow for a user to search for food in which a search result includes a list of dishes available across multiple restaurants.

The search criteria can include one or more attributes such as a name of the dish, an ingredient of the dish, a name of a diet (e.g., Keto diet), etc. An entry in the list of dishes can include information such as a name of a dish, name of the restaurant at which the dish is available, a price of the dish at the restaurant, an image of the dish and a user rating of the dish. The user can select a specified entry in the list to view detailed information about the selected dish, such as ingredients of the dish, any ingredient the user may be allergic to, a number of calories in the dish, etc. While the above information is an example of types of information that can be included, other embodiments can include other types of information. For example, in some embodiments, each entry could also include a featured review of the dish from one of the reviewers. In another example, the additional information may not include allergy information, may include a name of the diet with which the selected dish is compliant, may include preparation time etc.

The search platform also can allow for a user to view an augmented-reality (AR) based image of the selected dish on a user device. The AR-based image can be a three-dimensional (3D) image of the selected dish overlayed over an image of an environment captured by a camera of the user device. A user can view the AR-based image of the dish prior to placing an order for the dish. The AR-based image can allow for the user to zoom in, zoom out, view at various angles or various sides of the dish to get a clearer view of the dish than a traditional two-dimensional (2D) image.

The search platform can also allow for the user to create a user profile that includes their preferences, such as dietary preferences, dietary restrictions (e.g., allergies to any ingredient), location preferences for the restaurant, type of ambience, average cost of food, etc. For example, a user can submit dietary restrictions, such an allergy to nuts or a preference for vegetarian food options. When the user searches for food and selects one of the dishes from the search result, if the selected dish violates the user preferences (e.g., the dish has any ingredient that is allergic to the user), the search platform can alert the user regarding the ingredient (e.g., by generating a notification, a pop-up, highlighting the ingredient etc.) notifying the user about the presence of an ingredient in the dish. Accordingly, in this example, upon alerting the user that the dish contains an ingredient in which the user is allergic to, the user may stop from ordering the dish.

The search platform also allows users to review a single dish. The review can include at least one of a subjective review in which the user can describe their opinion of the dish in words, or an objective review in which the user inputs a rating (e.g., defined using a particular scale such as 1-5 stars) that is indicative of the user's opinion of the dish. The search platform can also allow the users to submit reviews of the restaurant.

The search platform can also allow for the user to search for restaurants in addition to food. The search for restaurants can generate a list of restaurants that matches the search criteria entered by the user. The search criteria can include one or more attributes, such as a name of the dish, a name of a restaurant, location of the restaurant, cuisine, average cost of food, etc.

Environment Overview

FIG. 1 is a block diagram of an example environment 100 in which the search platform can be implemented. The search platform can be implemented as a web search platform, which can include a website that can be accessed using a web browser on a client device 110, such as a laptop, or as a mobile app that can be executed on a mobile client device 110, such as a smartphone. In some embodiments, the search platform is implemented as a mobile app that can be executed on the mobile client device 110. The environment 100 can include a server computing device ("server") 105 that hosts a search engine to search for entities, products, or services. In some embodiments, the search engine is implemented for searching restaurants and/or food. Users can issue a search request for restaurants or food from the mobile app. The server 105 can receive a request 130 from a user 120 associated with the client device 110 for performing a search (e.g., for food). The request 130 can include one or more attributes (e.g., a name of dish, such as "Burger"). For instance, server 105 can perform a search in a storage system 125 and retrieve information regarding dishes with name "Burger" in the menus provided by various restaurants (e.g., first vendor 140 and second vendor 145). The server 105 can transmit search results 135, which can include a list of the retrieved dishes, to the client device 110. The client device 110 can then display the list to the user 120 in the mobile app.

Each entry in the search results 135 can include information regarding a dish in the corresponding entry, such as one or more of a name of the dish, name of the restaurant at which the dish is available, a price of the dish at the restaurant, a thumbnail image of the dish and a user rating of the dish, etc. The user 120 can select a specified entry in the search results 135 to view detailed information about the selected dish, such as ingredients of the dish, a number of calories in the dish, nutrition information of the dish, a 2D image of the dish, etc. The mobile app can also notify the user 120 in an event the dish contains any ingredient the user 120 is allergic to. For example, the detailed information section can highlight the ingredient the user is allergic to by changing one or more attributes such as a font, color, or style, associated with allergic ingredient to be distinct from that of the other ingredients. In another example, the mobile app can generate a notification in the detailed information section mentioning the allergic ingredient. The mobile app allows the user 120 to create a user profile, which can include information associated with the user 120, such as user name, contact information, dietary preferences, dietary restrictions (e.g., allergies to any ingredient), location preferences for the restaurant, type of ambience, and average cost of food. The user 120 may continue to view information regarding one or more dishes presented in the search results 135. After selecting the dish the user 120 is interested in, the user 120 may continue to place an order for the dish in the mobile app or via telephone by calling the corresponding restaurant.

In some embodiments, the user 120 may want to view a picture of what the actual dish looks like before placing an order. The mobile app can provide an option for the user 120 to view a 3D model/image of the actual dish. For example, after selecting a dish from the search results 135, the user 120 may select the option, (e.g., tap an icon) to view a 3D image of the dish. In some embodiments, the mobile app presents the image as AR-based 3D image 155. When the 3D image option is selected, the mobile app can initialize an AR engine and ask the user to move the client device 110 such that a camera 115 associated with or of the client device 110 is pointed towards a flat surface 150. Upon detecting the flat surface 150, the mobile app can generate the AR-based 3D image 155 on an image of the flat surface 150 in a display screen of the client device 110. The AR-based 3D image 155 can appear as if the dish is placed on the flat surface 150.

Further, the user 120 can zoom in, zoom out, view the dish at various angles or various sides of the dish to get a clearer view of the dish than a traditional two-dimensional (2D) image.

In some embodiments, the mobile app can allow for the user to generate the AR-based 3D image of multiple dishes. For example, the user 120 may add multiple dishes to an order and then select the option to view the 3D image and the mobile app can generate the AR-based images of the multiple dishes in the display screen of the client device 110.

Client device 110 can include any network-enabled computing device that is capable of accessing the server 105 over a communication network (e.g., Internet) issuing a search request to the server 105, receiving and displaying search results and that is equipped with at least one camera. For example, the client device 110 can be any of a desktop, a laptop, a tablet PC, a smartphone, or a wearable device. The camera 115 can be integrated into the client device 110 (e.g., built-in, or can be attached to the client device 110). In some embodiments, different versions of mobile app can be implemented for different types of client devices. For example, the mobile app for a tablet PC, which has a larger form factor than a smartphone, can be different from the mobile app for a smartphone to cater to the different form factors and other capabilities of the client devices.

The search platform can provide a vendor management graphical user interface (GUI) for performing vendor related functions. For example, restaurant vendors, such as a first vendor 140 and a second vendor 145, can use the vendor-management GUI for performing functions, such as creating or managing a vendor profile and uploading and/or updating their menu. The vendor profile can include information associated with a vendor (e.g., vendor name, address, contact information). The menu can include information regarding one or more dishes served by the vendor, such as a name of the dish, price of the dish, spice level (if any), cost, pictures of the dish, ingredients, cuisine, calories, etc.

The vendor-management GUI can be implemented as at least one of a mobile app or a web interface that can be accessed using a web-browser. For example, the first vendor 140 can access the vendor-management GUI using a mobile app installed on the client device 141 and the second vendor 145 can access using a web interface via a web browser on the client device 146. In some embodiments, a vendor can register with the search platform without providing a 3D model of the food. Further, the vendor can request the search platform to generate and include 3D models of their menu items in the search platform.

Users of the search platform can subscribe to one or more topics (e.g., a food category, a restaurant, offers). For example, users can subscribe to a "Keto" diet category, and the search platform and/or the vendors can send messages regarding the food category to the subscribed users. Continuing with the example, if a restaurant has a new addition of a Keto diet entrée to their menu, the restaurant or the search platform can notify the subscribed users regarding the new addition.

The storage system 125 can include one or more storage devices, such as hard-drives, solid-state drives, for storing various information that can be used by the search platform for serving the users and the vendors. For example, the storage system 125 can store user profiles of the users of the search platform, their order related information, vendor profiles of the vendors, menus of the vendors, pictures associated with dishes, and 3D images associated with the dishes.

In some embodiments, the search technique employed by the search engine can include a tag-based search. In a tag-based search, the data items can be associated with at least one tag, which can be one or more words, and the search engine searches for the data items having tags that match with input keyword. A tag can be representative of one or more attributes of a data item. For example, a tag associated with a dish can be indicative of a name of the dish, cuisine of the dish, a diet with which the dish is compliant (e.g., keto, a spice level, a calorie level (e.g., low, medium or high), cost or cost range (e.g., less than $5, >$10), an ingredient, and type of food (e.g., vegetarian, vegan, gluten free or non-vegetarian)). A dish can have more than one tag. The data regarding a dish can be stored in the storage system 125 with the associated tags. In some embodiments, the tag-based search enables the search platform to automatically associate a tag with the dish to provide an improved search experience. For example, if the nutritional information and ingredients for the dishes fall within a certain category of a diet (e.g., Keto), the search platform can automatically assign that tag to a dish. So, when the user 120 searches for keto, vegan, or paleo, the search will populate the dishes associated with those tags.

The tags can be provided by the vendors (e.g., using the vendor-management GUI or added by the search platform). When the user 120 enters a search keyword (e.g., vegan), in the mobile app, the server 105 can search the storage system 125 for dishes having tags matching the keyword "vegan." The search keyword can be any of a name of the dish, cuisine of the dish, a diet with which the dish is compliant (e.g., keto), a spice level, a calorie level (e.g., low, medium or high), cost or cost range (e.g., less than $5, >$10), an ingredient, and type of food (e.g., vegetarian, vegan, gluten free or non-vegetarian). If the search keyword does not match with any of the tags, then the mobile app may indicate to the user 120 no results were yielded for the search keyword, and in some embodiments, the mobile app can also recommend some popular dishes in the user's location to the user 120. The search platform can search for food from restaurants in the location (a) specified by the user 120, or (b) of the user 120, which is determined based on the location of the client device 110 (e.g., using location-based services of the client device 110).

While the above paragraphs describe the search being performed by the server 105, in some embodiments, the search can also be performed in the mobile app. In some embodiments, the mobile app can store the information regarding the restaurants and their menus in a database on the client device 110 and when the user 120 issues a search command, the search is performed in the database on the client device 110.

Search Platform Overview

Figure 2:
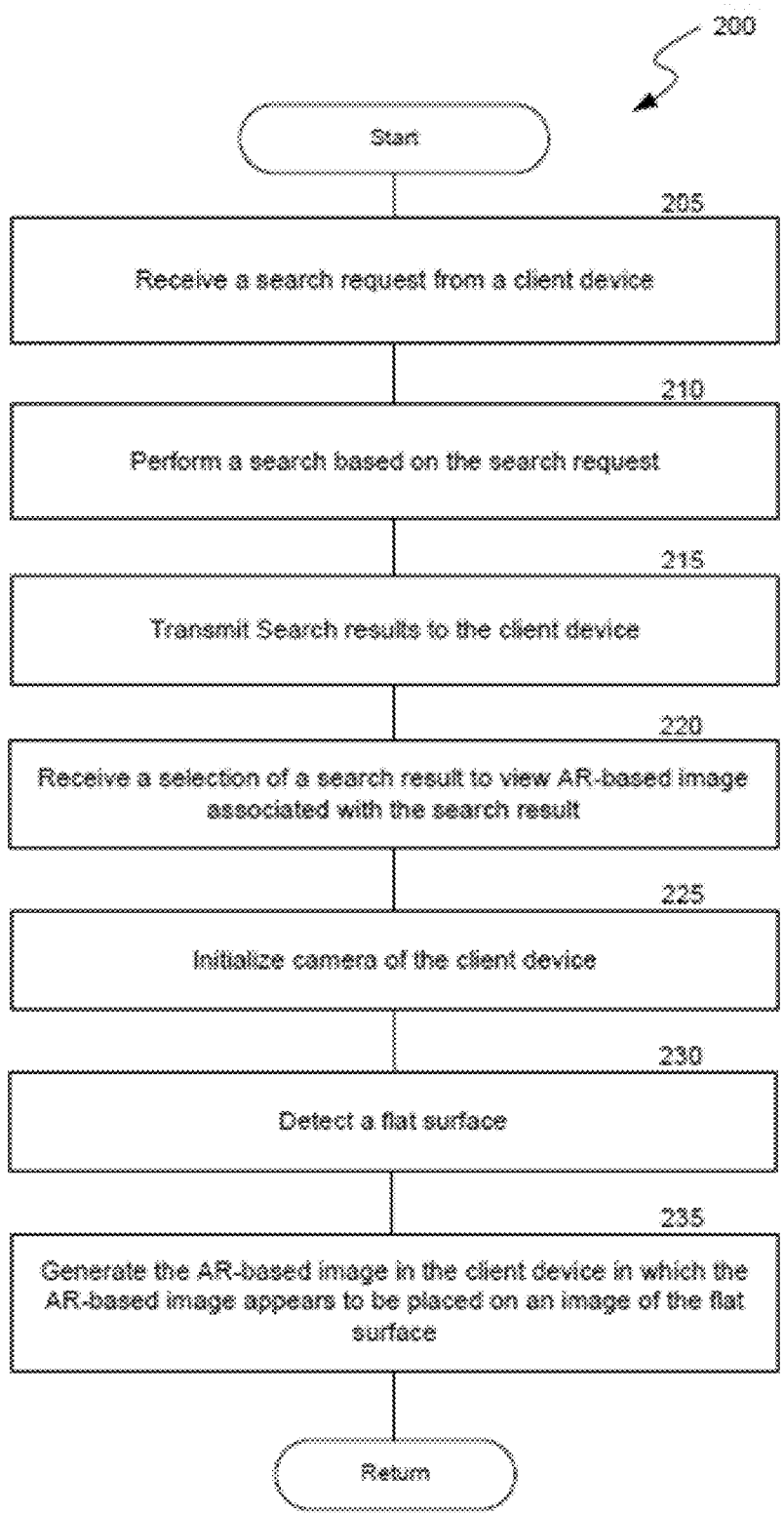
FIG. 2 is a flow diagram of a process for searching for food using the search platform of FIG. 1, consistent with various embodiments.

FIG. 2 is a flow diagram of a process for searching for food using the search platform of FIG. 1, consistent with various embodiments. In some embodiments, the process 200 can be implemented in the environment 100 of FIG. 1. At block 205, the server 105 can receive a search request from a user associated with a client device. For example, the search request can be a search request 130 for food issued by the user 120 from a mobile app on the client device 110. The search request can include a search keyword that is indicative of one or more attributes associated with food, such as a name of the dish, cuisine of the dish, a diet with which the dish is compliant (e.g., keto), a spice level, a calorie level (e.g., low, medium or high), cost or cost range (e.g., less than $5, >$10), an ingredient, and type of food (e.g., vegetarian, vegan, gluten free or non-vegetarian). The mobile app allows the user 120 to type in the search keyword or provides the user 120 a list of options to choose from (e.g., "pizza," "burger," "fast food," "tacos," "salmon"). The list of options can be provided as text, images, or in any other suitable format.

At block 210, the server 105 can perform a search in the storage system 125 based on the search request to retrieve data items that match the search request. For example, the server 105 searches various menus stored in the storage system 125 for dishes that match the search request. In some embodiments, the server 105 may compare the tags associated with the dishes in the storage system 125 with the search keyword from the search request 130 to retrieve the matching dishes.

At block 215, the server 105 can transmit the search results to the client device. For example, the server 105 transmits the search results 135 to the client device 110. The search results 135 can include a list of dishes that matches the search request. The user 120 can view the list of dishes in the mobile app. The user 120 can select a specified dish from the list to view additional information and/or place an order.

At block 220, the mobile app can receive a user selection of the search result. Upon receiving a selection of the search result, the mobile app can generate a GUI to display detailed information of the search result. The detailed information GUI can also provide an option to view an AR-based image associated with the search result. For example, upon receiving a user selection of the specified dish from the search results 135, the mobile app can generate a detailed information GUI that displays detailed information associated with the selected dish, which includes information such as the ones mentioned with reference to FIG. 1. The user 120 can select the option to view the AR-based 3D image of the specified dish. In some embodiments, the user 120 can place an order for the specified dish from the detailed information GUI. The user 120 can place the order after viewing the AR-based 3D image or without viewing the AR-based 3D image.

At block 225, the mobile app can initialize the camera of the client device 110. As part of the initialization process, the mobile app can request the user to point the camera to a flat surface.

At block 230, the mobile app can detect the flat surface (e.g., flat surface 150). In some embodiments, the flat surface 150 is the top surface of a table.

At block 235, the mobile app can render an AR-based 3D image associated with the selected search result on a display screen of the client device. For example, the mobile app renders the AR-based 3D image 155 of the specified dish on the image of the flat surface 150.

Figure 3:
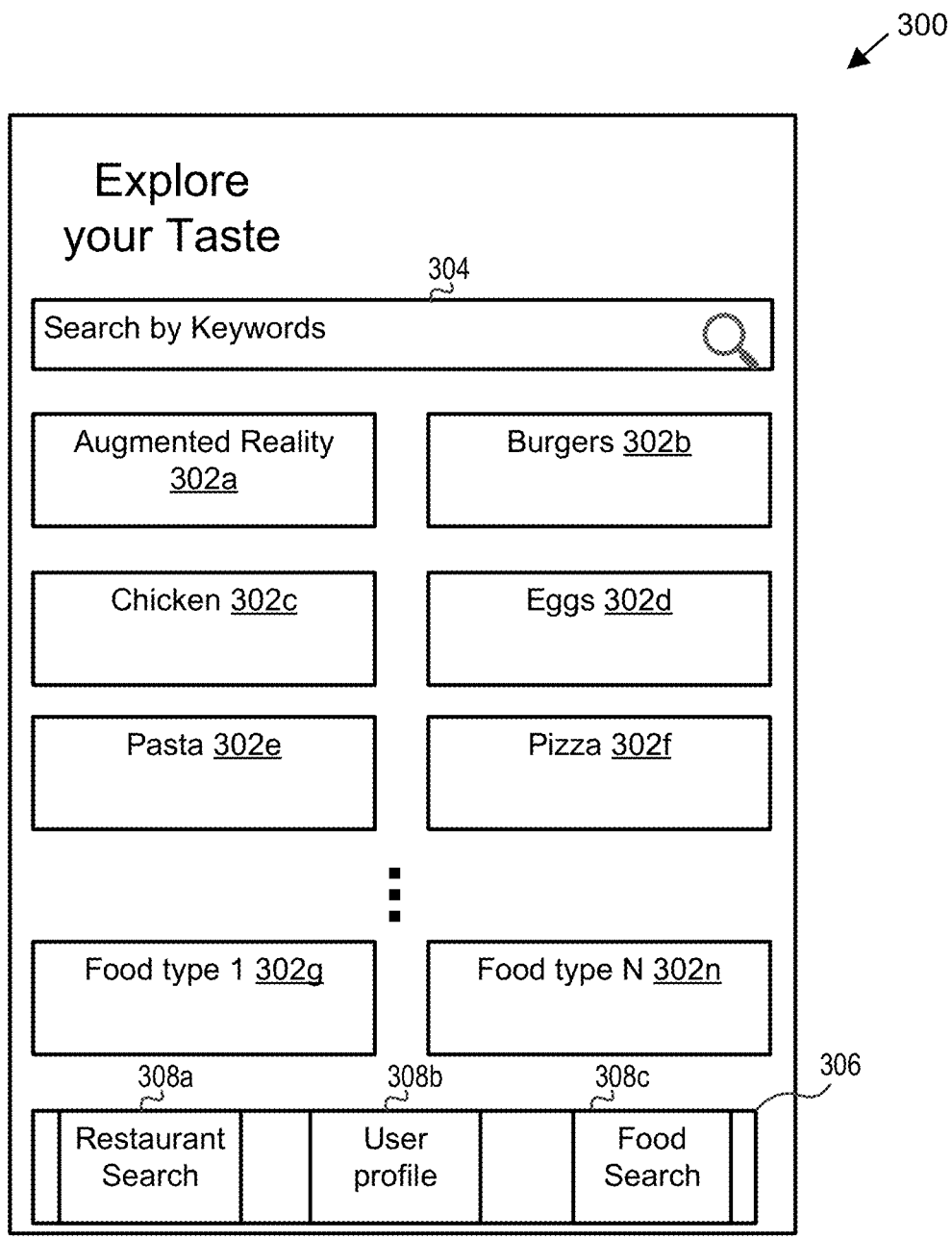
FIG. 3 is an example of a first GUI of a mobile app for searching food, consistent with various embodiments.

FIG. 3 is an example of a first GUI 300 of the mobile app for searching food, consistent with various embodiments. The first GUI 300 can display various categories of search provided by the mobile app. In the embodiment as shown in FIG. 3, the first GUI 300 includes an augmented category 302a, burger category 302b, chicken category 302c, eggs category 302d, pasta category 302e, pizza category 302f, food type 1 302g, food type N 302N, etc.

Figure 4:
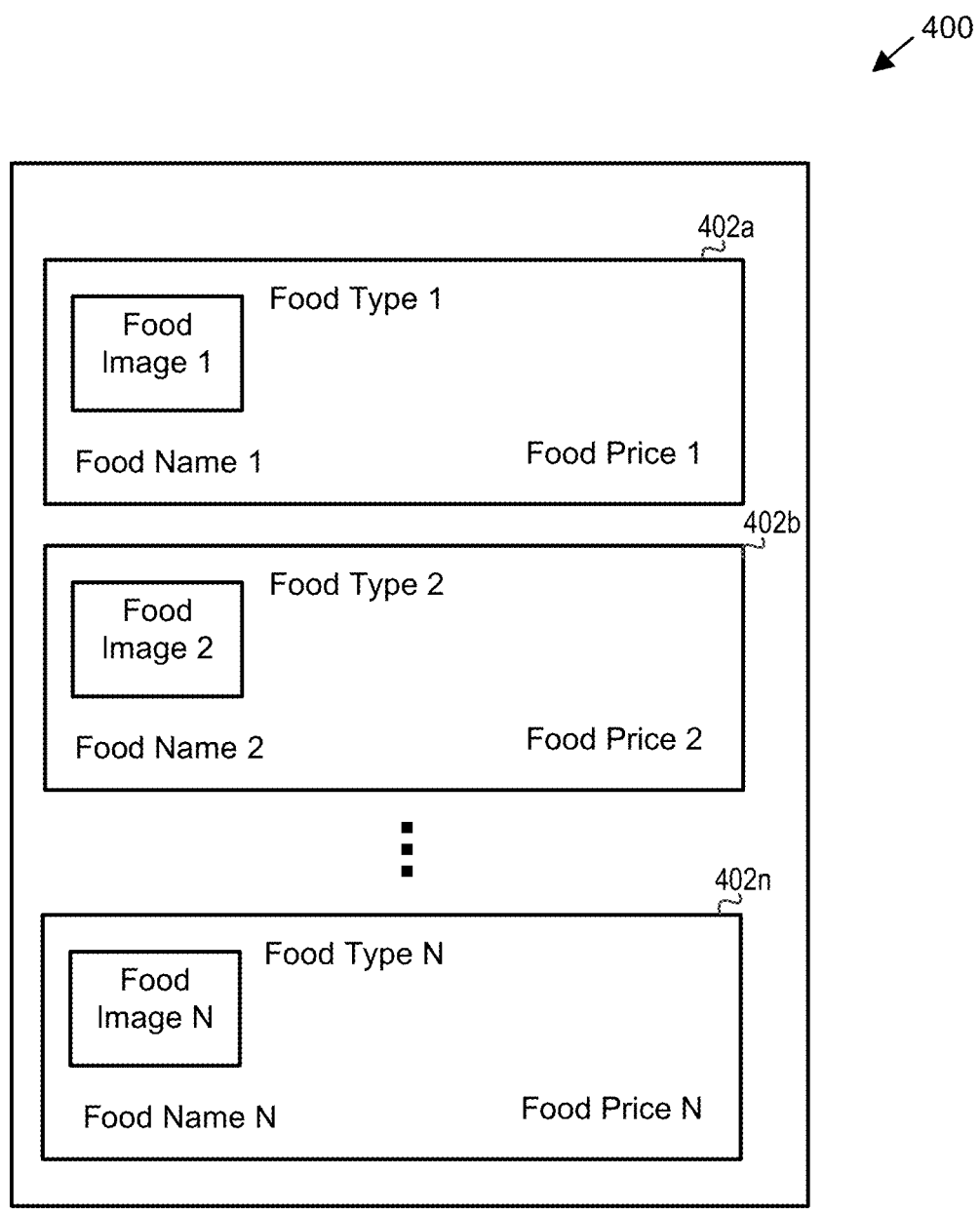
FIG. 4 is an example of a second GUI for displaying search results, consistent with various embodiments.

The user 120 can select any of these categories to search for dishes that correspond to those categories. For example, if the user 120 selects category "pasta," the mobile app displays dishes that are categorized under or tagged with the word "pasta," as illustrated in FIG. 4. The first GUI 300 can also provide a search box 304 where the user 120 can enter a search keyword to perform a search based on the entered keyword, as illustrated at least with reference to FIGS. 6 and 7.

The first GUI 300 can also include a section 306 (e.g., bottom bar) which allows the user to switch between multiple options. For example, selecting the first icon 308a, which is indicative of restaurant, allows the user to search for restaurants, as illustrated at least with reference to FIGS. 9 and 10. In another example, selecting the second icon 308b, which is indicative of a user account, allows the user to manage user profile (e.g., create or manage user profile and user preferences (described above at least with reference to FIG. 1)), as illustrated at least with reference to FIG. 11. Selecting the third icon 308c, which is indicative of food, can present the user 120 with the first GUI for performing a search for food.

FIG. 4 is an example of a second GUI 400 for displaying search results, consistent with various embodiments. The second GUI 400 can display the search results of the search performed based on the user selection of the category "pasta" from the first GUI of FIG. 1. As shown in FIG. 4, the second GUI can display a series of search results 402a-n. Each search result 402a-n can include information about a search result, such as a food type, food image, food name, food price, etc.

The search results can include a number of pasta dishes. Each entry in the search result can display a name of the dish, a name of the restaurant at which the dish is served, and a price of the dish. The amount and/or type of information displayed in an entry can vary. In some embodiments, the search results are sorted in a specific manner. For example, the search results are sorted by distance of the restaurants of the food displayed (e.g., nearest first). In some embodiments, the search results are displayed based on user ratings of the food. In some embodiments, the search results are ordered according to the user preference inferred with machine learning from the past user actions.

Figure 5A:
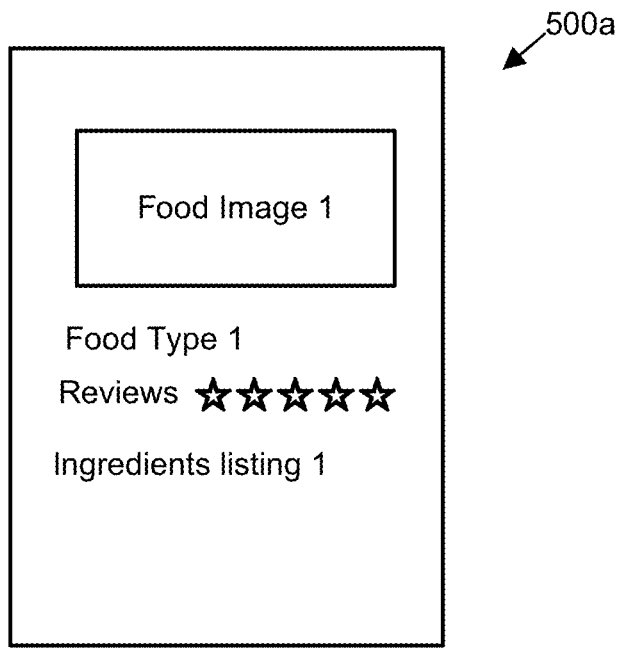
FIG. 5A is an example of a third GUI for displaying detailed information of a dish, consistent with various embodiments.

FIG. 5A is an example of a third GUI 500a for displaying detailed information of a dish, consistent with various embodiments. The third GUI 500a can display additional information of a dish (e.g., that is selected from the search results of the second GUI of FIG. 2). The additional information can include a rating of the dish (which can be an aggregate of ratings provided by multiple users), ingredients of the dish, and picture of the dish.

Figure 5B:
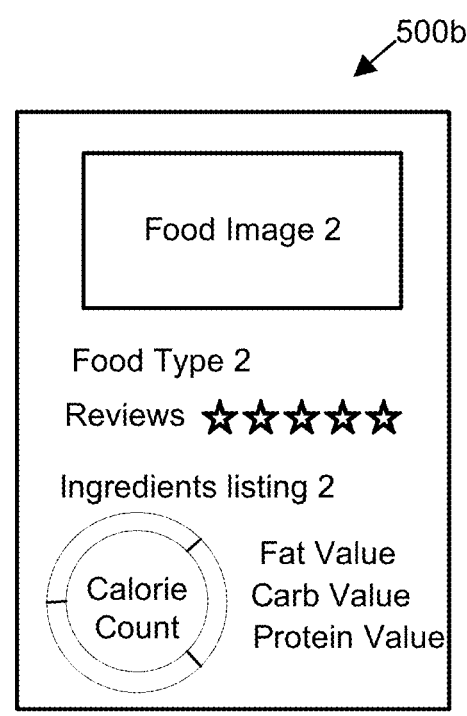
FIG. 5B is an example of a fourth GUI for displaying detailed information of a dish, consistent with various embodiments.

FIG. 5B is an example of a fourth GUI 500b for displaying detailed information of a dish, consistent with various embodiments. The fourth GUI 500b can display calories and nutritional information of the dish that is displayed in the third GUI of FIG. 3.

Figure 5C:
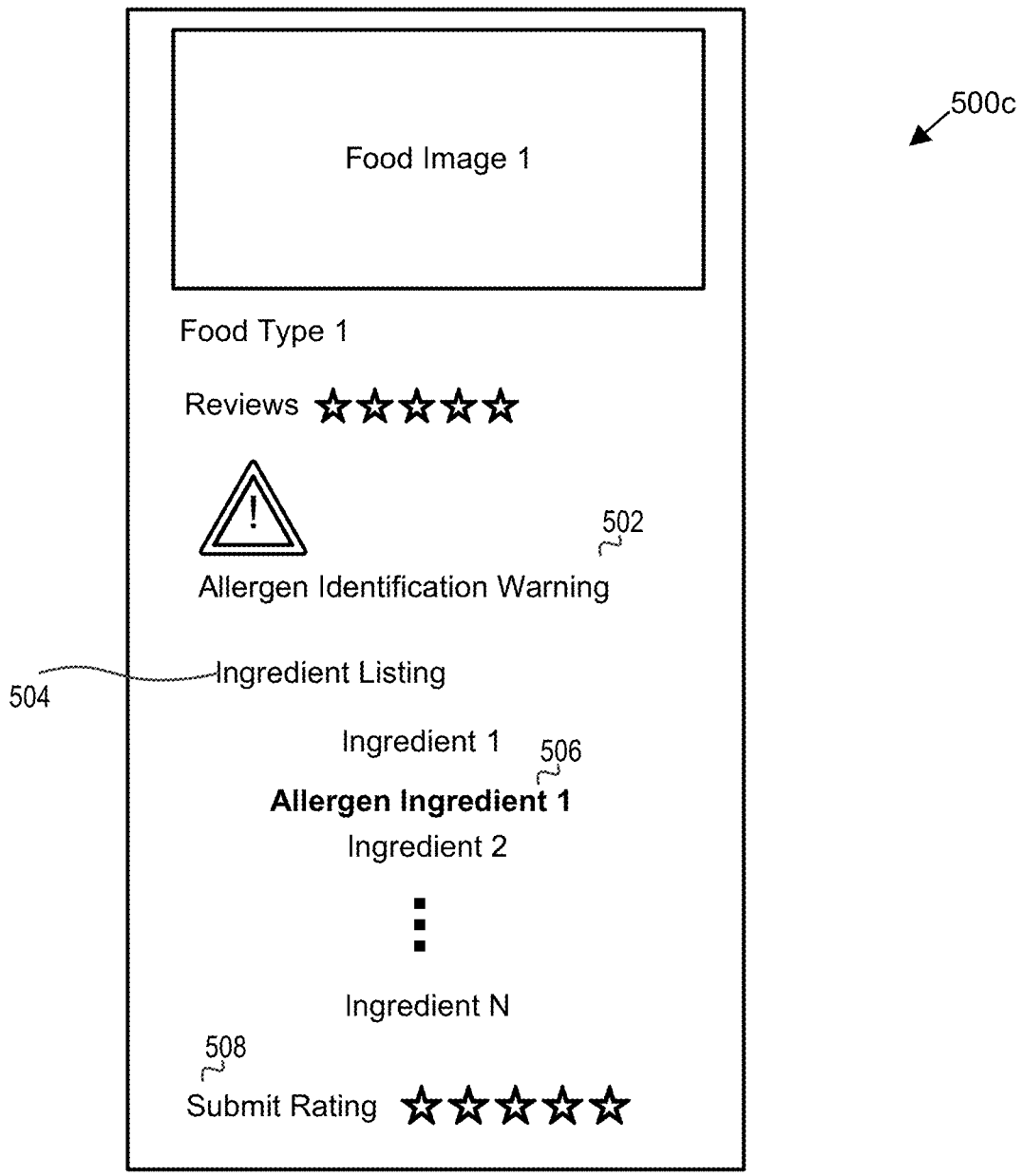
FIG. 5C is an example of a fifth GUI for displaying detailed information of a dish, consistent with various embodiments.

FIG. 5C is an example of a fifth GUI 500c for displaying detailed information of a dish, consistent with various embodiments. The fifth GUI 500c can display additional information of a dish, such as a rating of the dish (which can be an aggregate of ratings provided by multiple users), ingredients of the dish, and picture of the dish. The fifth GUI 500c can also display an alert 502 notifying the user 120 of ingredients that the user 120 has identified as being allergic to (e.g., "*Quinoa*"). The information regarding allergens can be updated in the user profile, as illustrated at least with reference to FIG. 11B. The fifth GUI 500c can include an ingredients listing 504 that indicates allergen ingredients 506. The fifth GUI 500c can also include a rating submission 508 that allows the user to provide a rating that can be included in the reviews for the dish/restaurant.

Figure 6:
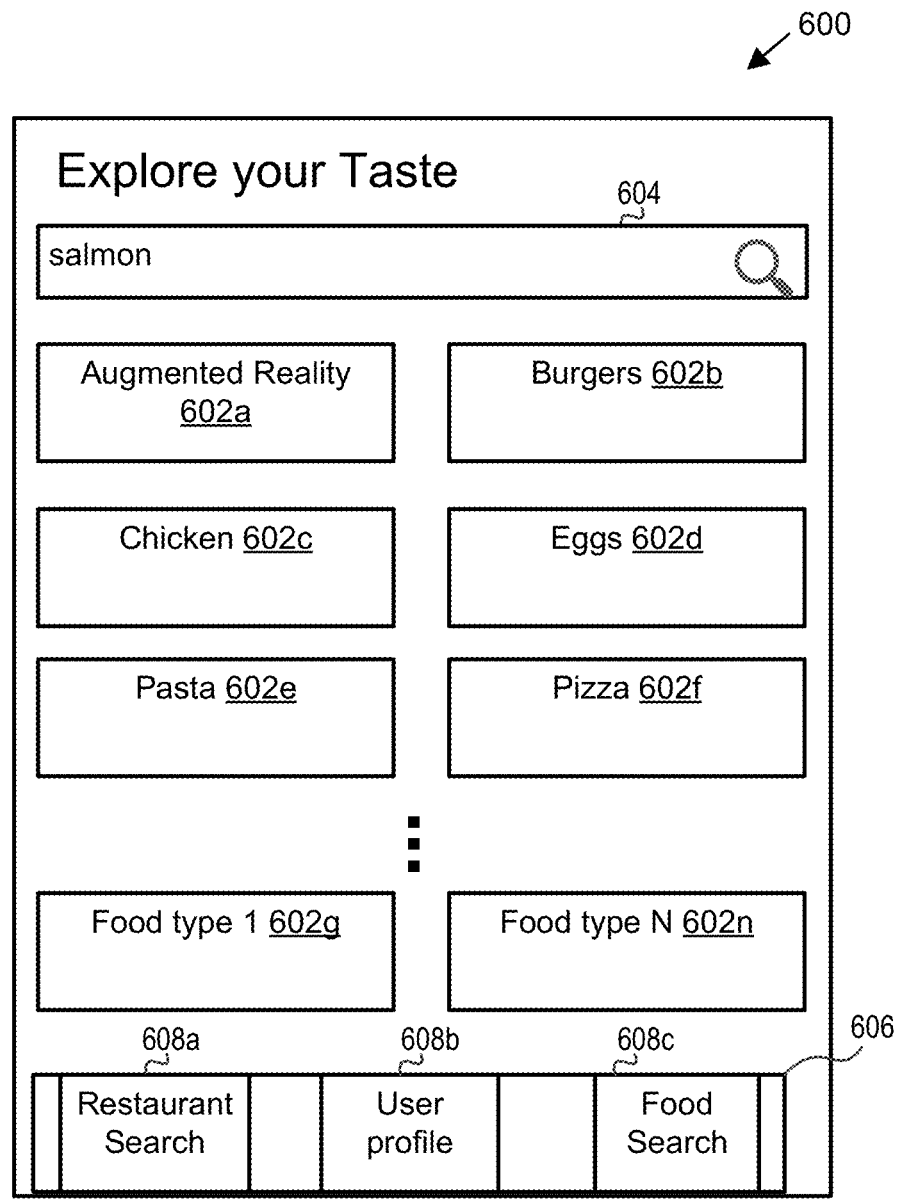
FIG. 6 is an example of a sixth GUI of the mobile app for searching food, consistent with various embodiments.

FIG. 6 is an example of a sixth GUI 600 of the mobile app for searching food, consistent with various embodiments.

The sixth GUI 600 can include various food types 602a-n. The sixth GUI 600 can provide a search box 604 where the user 120 can enter a search keyword, such as "salmon," to perform a search based on the entered keyword. The sixth GUI 600 can also include the bottom bar 606 that includes a restaurant search icon 608a, a user profile icon 608b, and/or a food search icon 608c.

Figure 7:
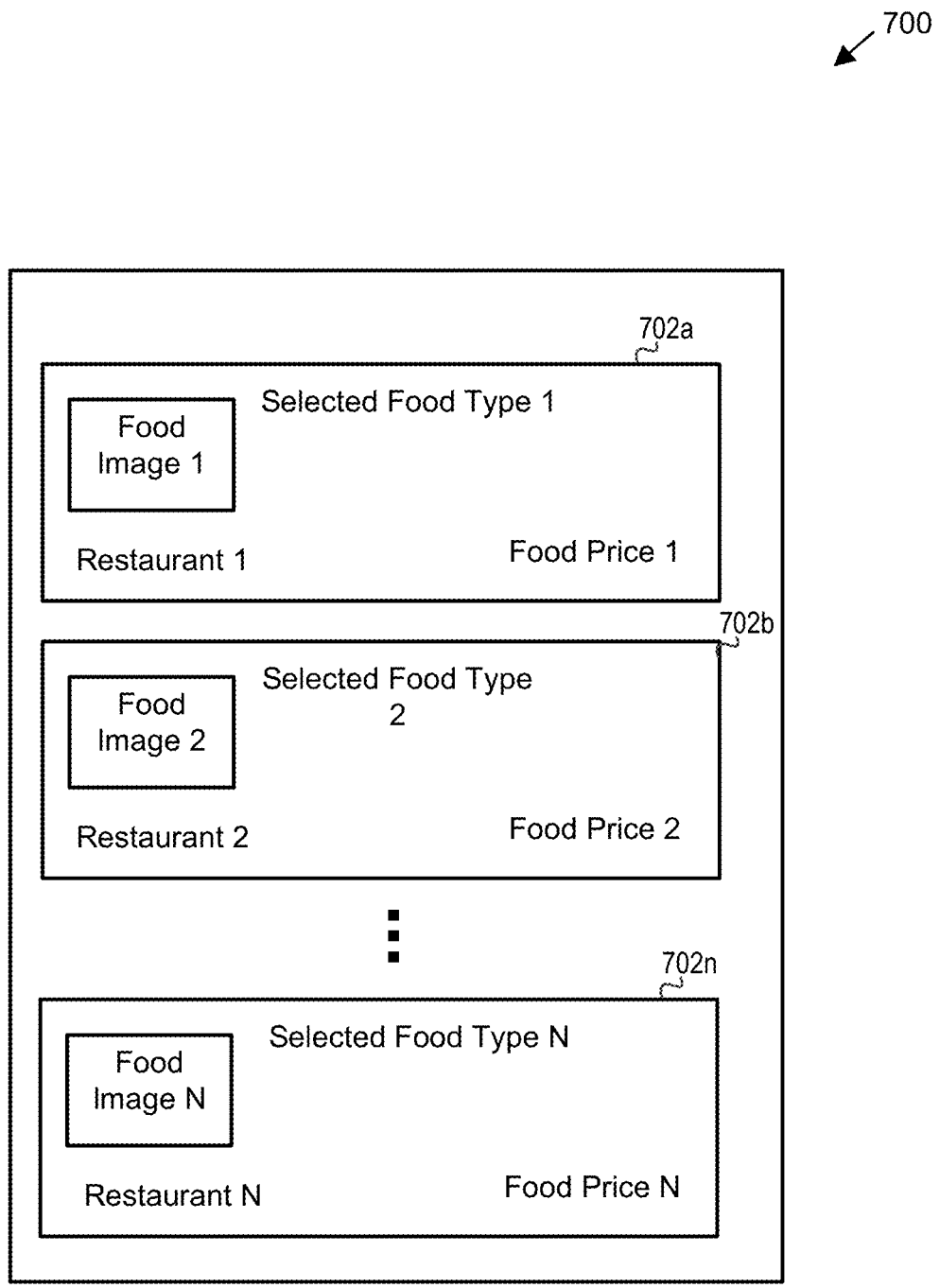
FIG. 7 is an example of a seventh GUI for displaying search results, consistent with various embodiments.

FIG. 7 is an example of a seventh GUI 700 for displaying search results 702a-n, consistent with various embodiments. In some embodiments, the seventh GUI 700 can be similar to the second GUI. The seventh GUI 700 can display the search results 702a-n of the search performed based on the user input keyword "salmon." The search results can include a number of salmon-based dishes.

Figure 8A:
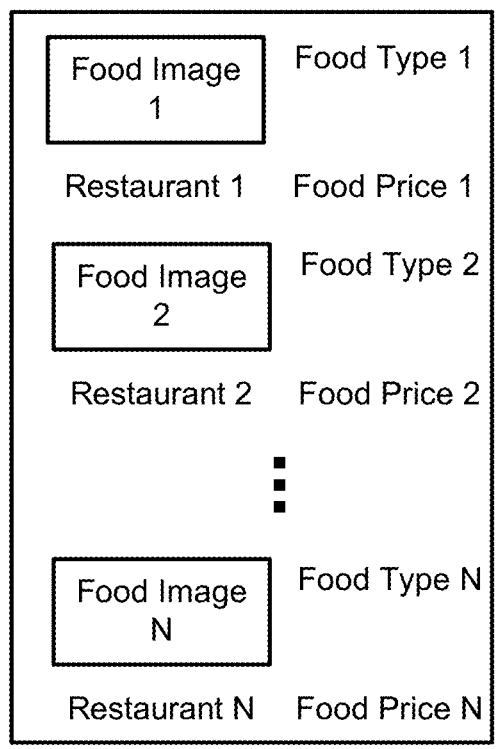
FIG. 8A is an example of an eighth GUI for displaying search results, consistent with various embodiments.

FIG. 8A is an example of an eighth GUI 800a for displaying search results, consistent with various embodiments. The eighth GUI 800a can display the search results of the search performed based on the user selection of the category "Augmented Reality" from the first GUI of FIG. 1. The search results can include a number of dishes for which the user 120 can view the AR-based images associated with the dishes.

Figure 8B:
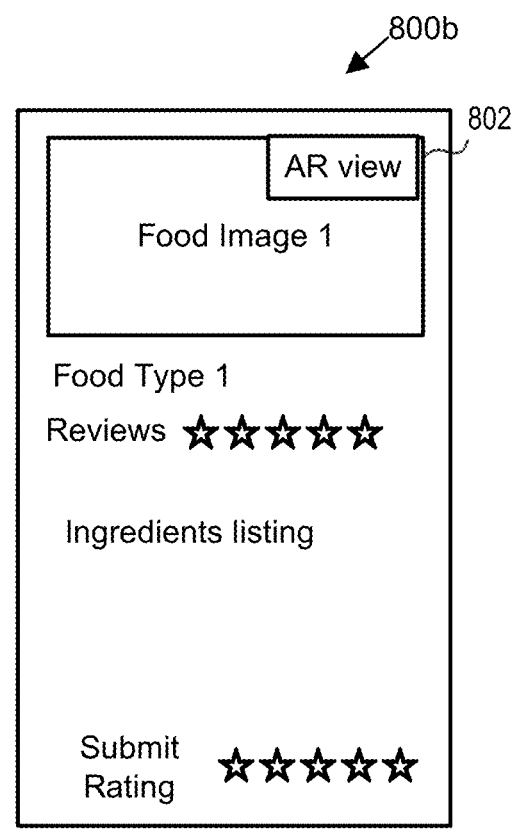
FIG. 8B is an example of a ninth GUI for displaying detailed information of a dish, consistent with various embodiments.

FIG. 8B is an example of a ninth GUI 800b for displaying detailed information of a dish, consistent with various embodiments. The ninth GUI 800b can display detailed information, such as the ingredients of the dish, of a dish that is selected from the search results displayed in the eighth GUI of FIG. 8A. Note that the ninth GUI 800b can also provide an AR View icon 802 that can be selected by the user 120 to view the AR-based 3D image of the dish.

Figure 8C:
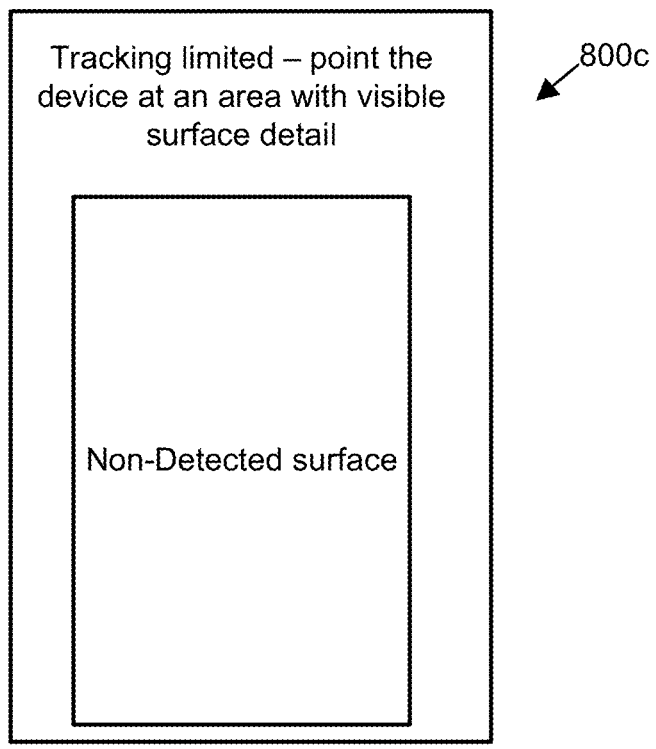
FIG. 8C is an example of a tenth GUI for displaying initialization process of the AR process for displaying an image, consistent with various embodiments.

FIG. 8C is an example of a tenth GUI 800c for displaying initialization process of the AR process for displaying an image, consistent with various embodiments. Upon selection of the option to view the AR-based 3D image of the dish in the ninth GUI, the mobile app can initialize an AR engine of the search platform, which can provide instructions to the user 120 to point the camera of the client device 110 to a flat surface, as illustrated in the tenth GUI.

Figure 8D:
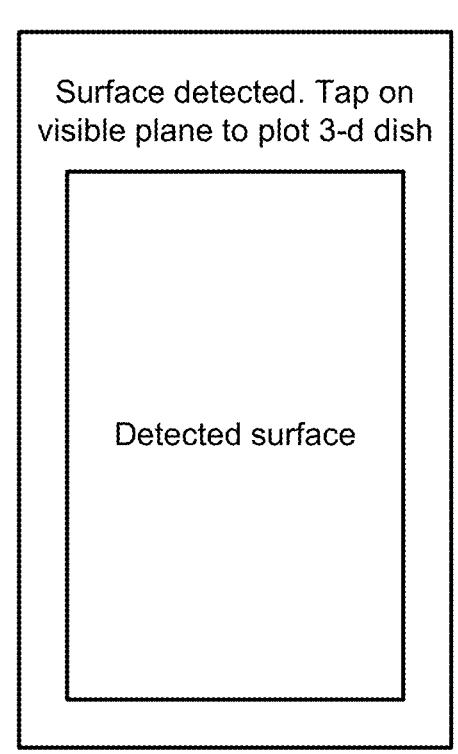
FIG. 8D is an example of an eleventh GUI for notifying the user that the AR engine has detected the flat surface, consistent with various embodiments.

FIG. 8D is an example of an eleventh GUI 800d for notifying the user that the AR engine has detected the flat surface, consistent with various embodiments. As shown in FIG. 8D, the eleventh GUI 800d can indicate that a surface is detected and that the 3D dish can be plotted on the detected surface upon an interaction on a visible plane by the user.

Figure 8E:
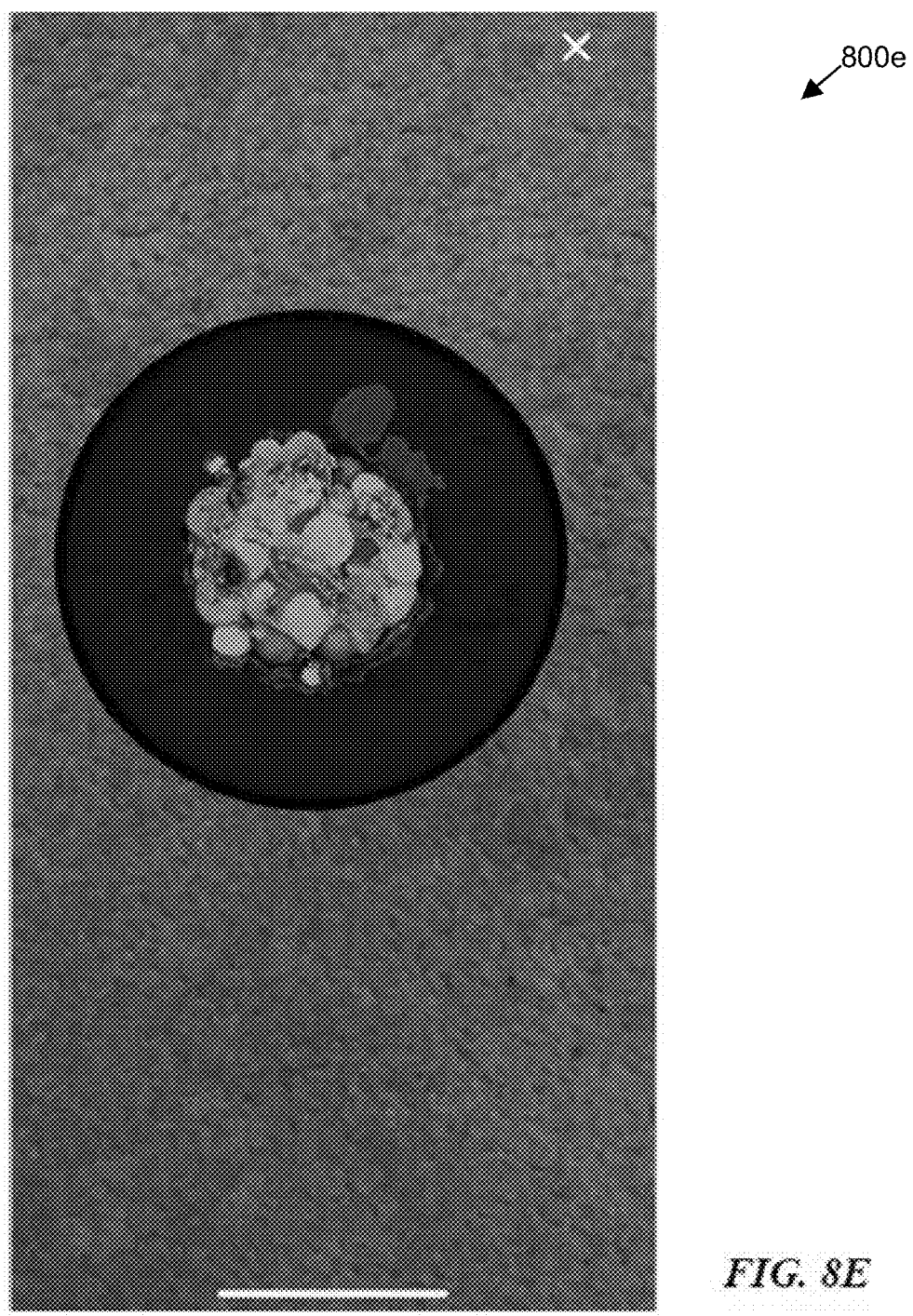
FIGS. 8E-8G are examples of a twelfth GUI for displaying the AR-based 3D image of a dish engine, consistent with various embodiments.
Figure 8F:
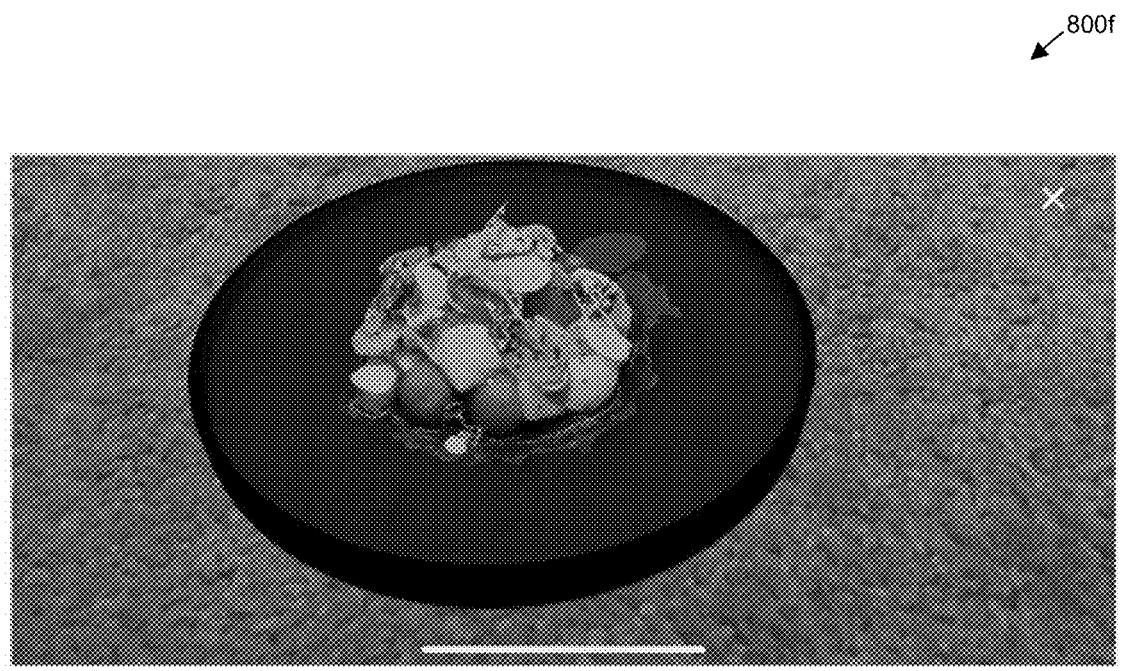
Figure 8G:
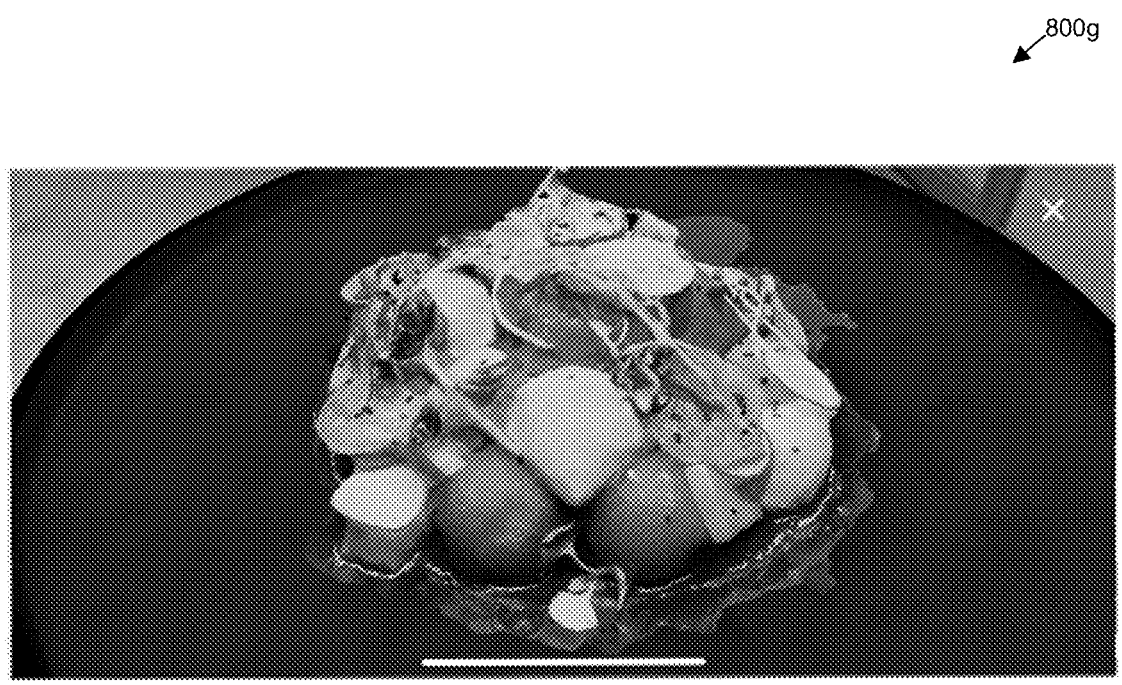

FIGS. 8E-8G illustrates various perspectives of a twelfth GUI 800e-g for displaying the AR-based 3D image of a dish, consistent with various embodiments. The twelfth GUI 800e-g can display the AR-based 3D image of the dish selected in the ninth GUI of FIG. 8B. The user 120 can zoom-in, zoom-out, and pan into the image to get different views as illustrated in FIGS. 8E-8G.

Figure 9:
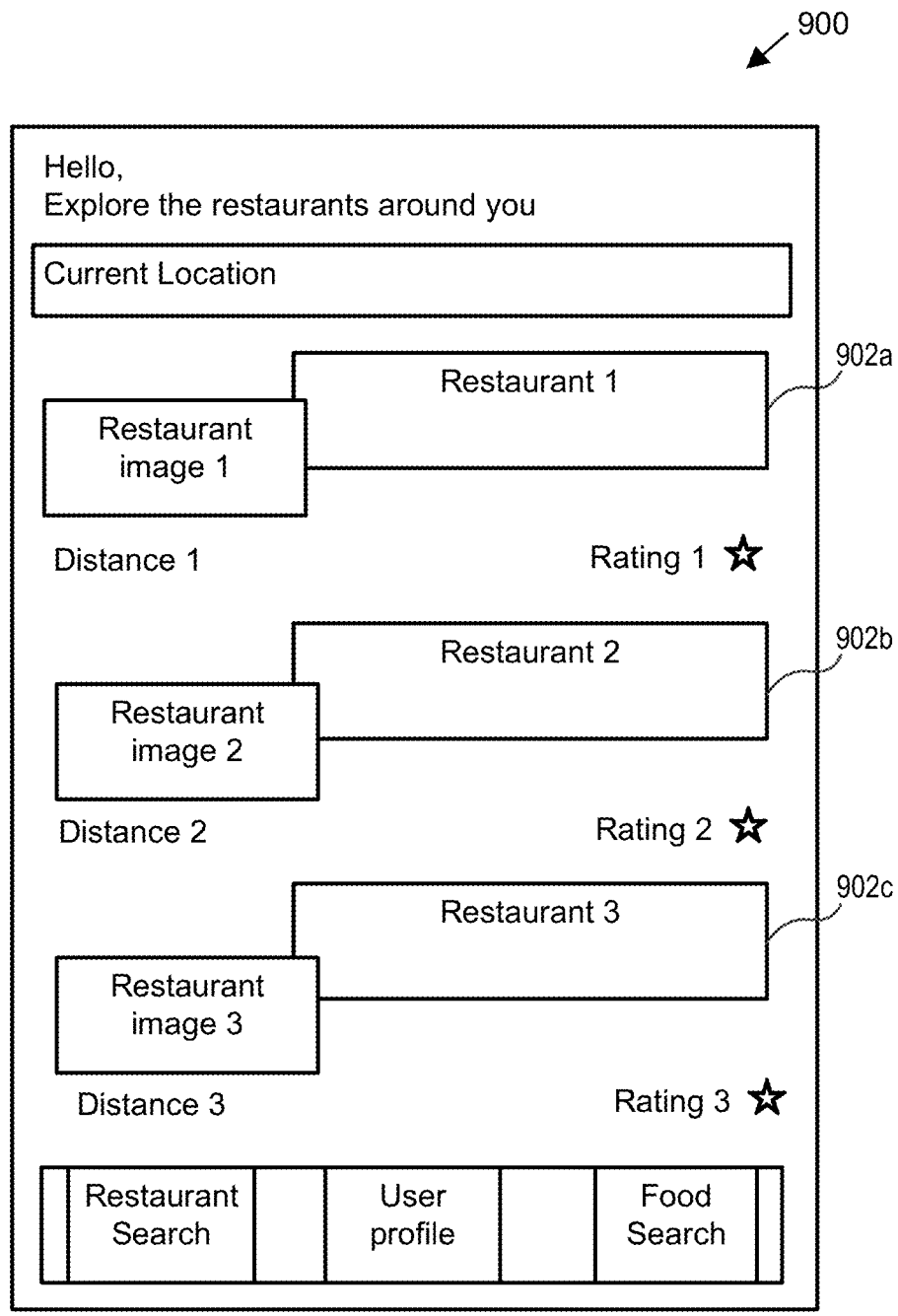
FIG. 9 is an example of a thirteenth GUI of the mobile app for searching restaurants, consistent with various embodiments.

FIG. 9 is an example of a thirteenth GUI 900 of the mobile app for searching restaurants, consistent with various embodiments. The thirteenth GUI 900 can display various restaurants (e.g., restaurant 1 902a, restaurant 2 902b, restaurant 3 902c) in a specified location. The specified location can be a user selected location or a location of the user 120 determined by the mobile app (e.g., based on the location of the client device 110).

The user 120 can select one of the restaurants to view additional information about the selected restaurant. The search results can be ordered in a specific manner. For example, the search results are sorted by distance of the restaurants (e.g., nearest first). In another example, the search results are displayed based on user ratings of a restaurant or the food at the restaurant. In another example, if the user has reviewed a dish and has given a good rating for the food or the restaurant, those restaurants may be displayed first. In some embodiments, the restaurants in the search results are ordered according to the user preference inferred with machine learning from the past user actions. Each restaurant 902a-c can include an image of the restaurant, a distance from the specified location, a star rating, etc.

Figure 10:
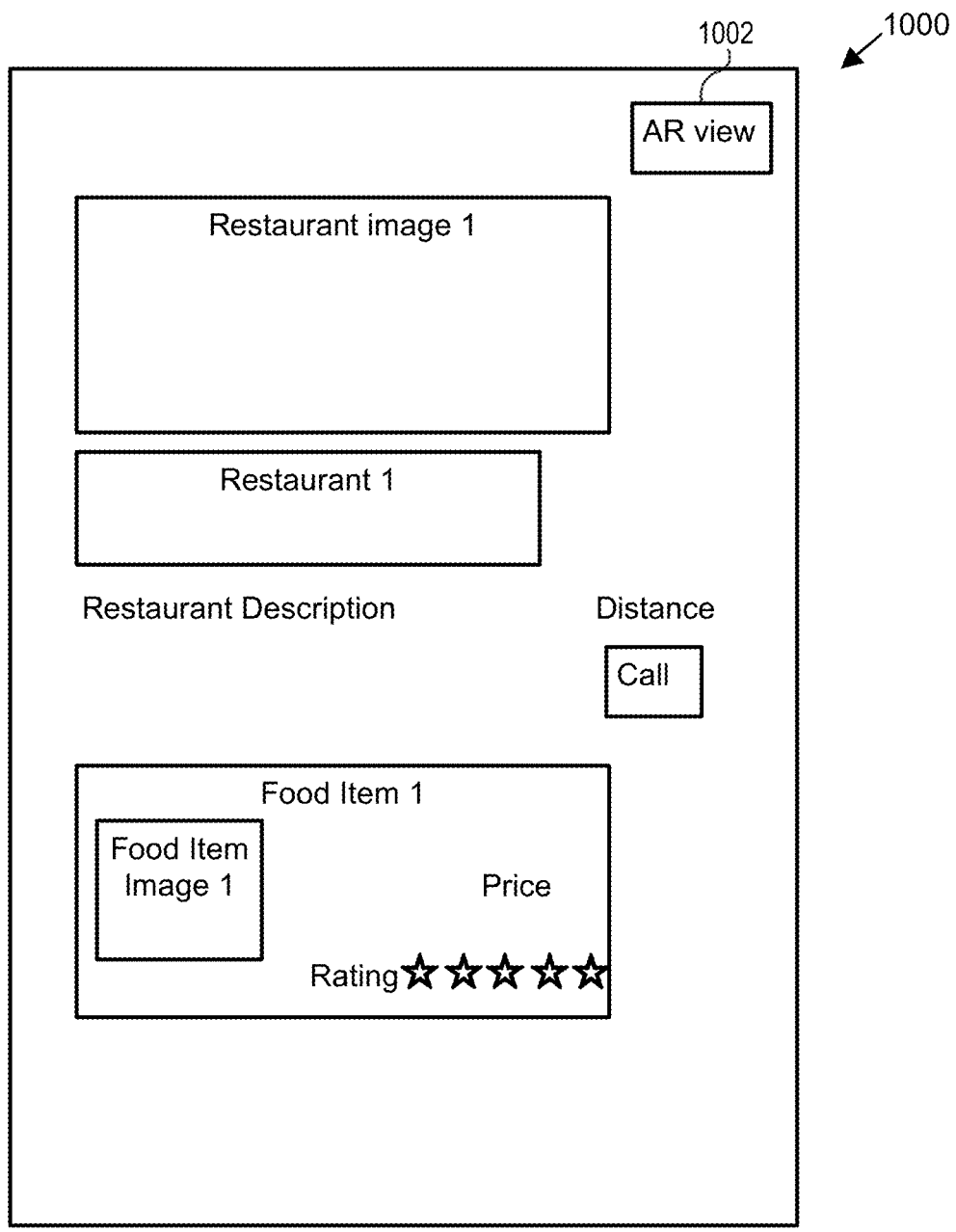
FIG. 10 is an example of a fourteenth GUI for displaying detailed information of a restaurant, consistent with various embodiments.

FIG. 10 is an example of a fourteenth GUI 1000 for displaying detailed information of a restaurant, consistent with various embodiments. The fourteenth GUI 1000 can display additional information of a restaurant (e.g., that is selected from the thirteenth GUI of FIG. 9). The additional information can include one or more of a rating of the restaurant (which can be an aggregate of ratings provided by multiple users), address, contact information, one or more pictures of the restaurant, and a menu of the restaurant. The fourteenth GUI 1000 can include an AR view button 1002 to provide a 3-d image of the food item (e.g., food item 1).

Figure 11A:
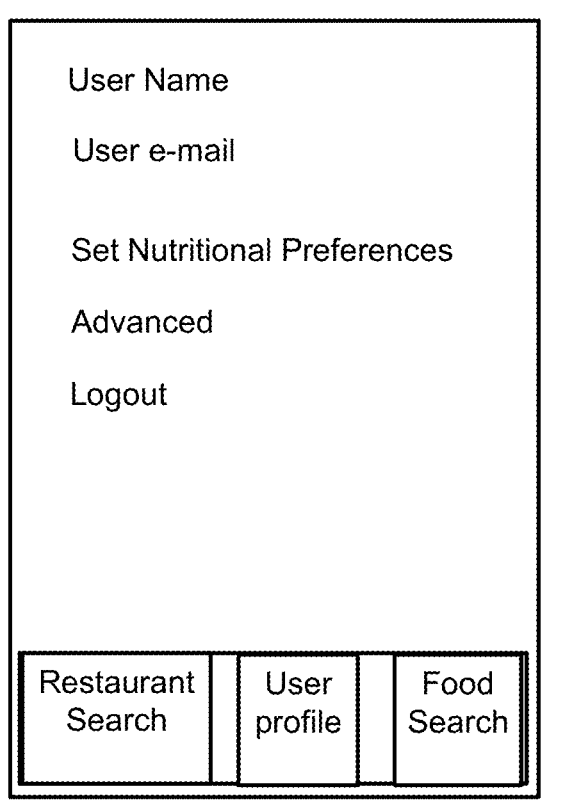
FIG. 11A is an example of a fifteenth GUI for managing a user profile, consistent with various embodiments.
Figure 11B:
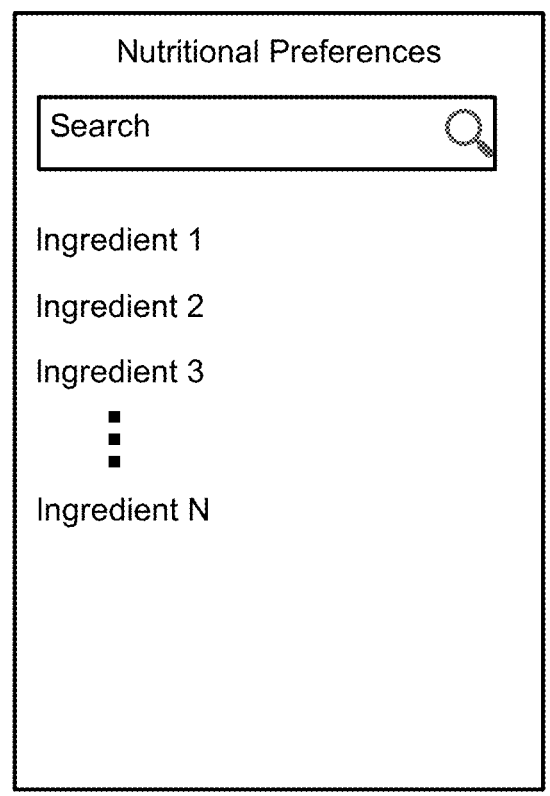
FIG. 11B is an example of a sixteenth GUI for updating dietary preferences of the user, consistent with various embodiments.

FIG. 11A is an example of a fifteenth GUI 1100a for managing a user profile, consistent with various embodiments. The fifteenth GUI 1100a can allow for the user to create and manage a user profile. The user profile can include an email ID of the user, user ID of the user, and other details such as date of birth, gender, contact information. The user 120 can also manage user preferences such as dietary preferences, dietary restrictions (e.g., allergies to any ingredient), location preferences for the restaurant, type of ambience, and average cost of food in the GUI. FIG. 11B is an example of a sixteenth GUI 1100b for updating dietary preferences of the user, consistent with various embodiments. The user can search for various ingredients to add to nutritional preferences for the user profile. This can include identifying ingredients that are allergens to the user or ingredients preferred by the user, for example.

Figure 12A:
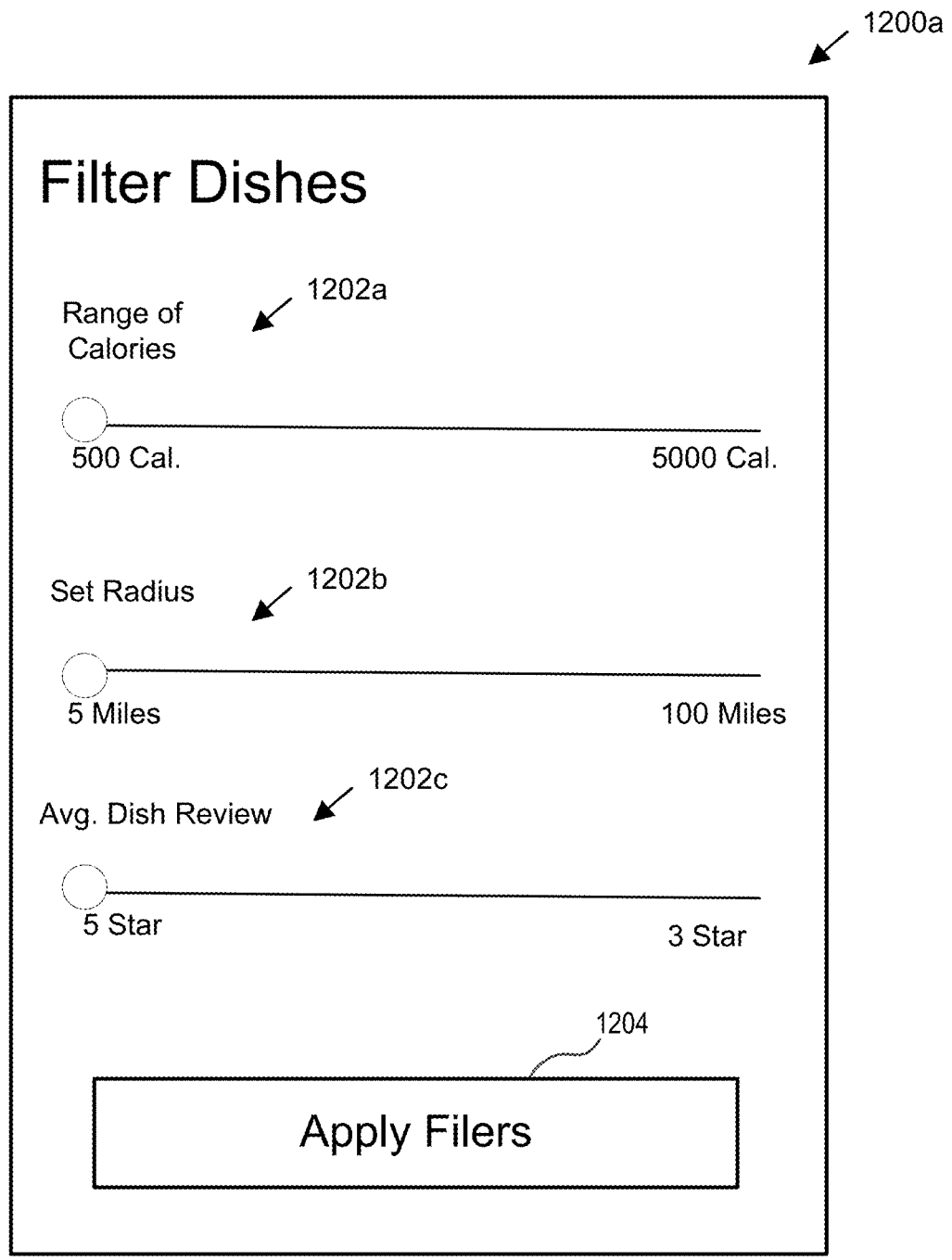
FIG. 12A is an example of a seventeenth GUI for filtering dishes, consistent with various embodiments.

FIG. 12A is an example of a seventeenth GUI 1200a for filtering dishes, consistent with various embodiments. As shown in FIG. 12A, various filters 1202a-c can allow for features of dishes and/or restaurants to be filtered. For instance, a first filter 1202a can include a calorie filter. The calorie filter 1202a can filter dishes by a number of calories for each dish.

As another example, a second filter 1202b can include a geographic radius. The geographic radius filter can filter dishes from restaurants outside the specified radius from the user. As another example, a third filter 1202c can include an average dish review filter that can allow for dishes to be filtered by a review associated with each dish. Filters can be applied via a apply filters button 1204.

Figure 12B:
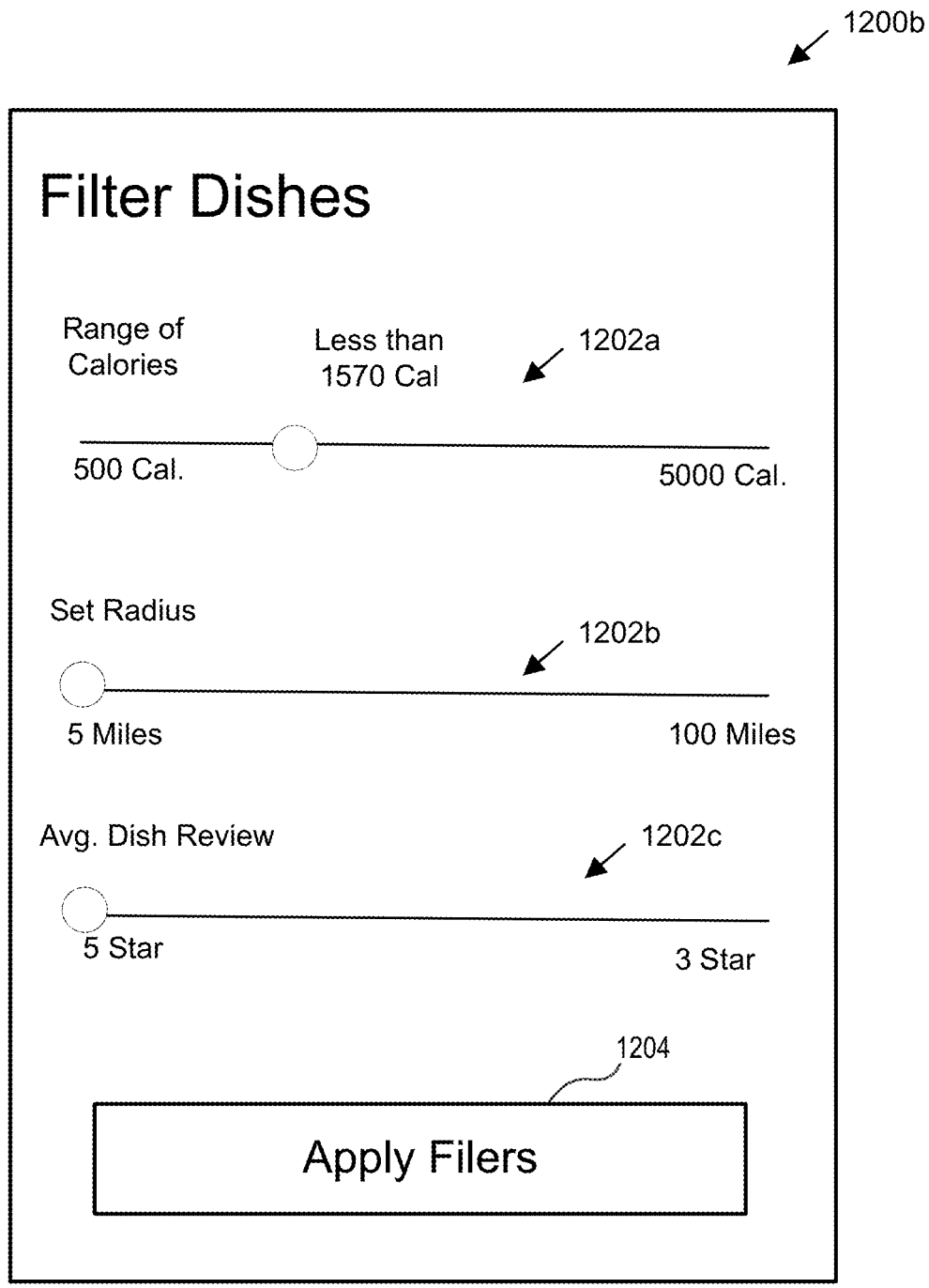
FIG. 12B is an example of an eighteenth GUI for filtering dishes, consistent with various embodiments.

FIG. 12B is an example of an eighteenth GUI 1200b for filtering dishes, consistent with various embodiments. As shown in FIG. 12B, any of the filters 1202a-c can be modified. For instance, the calorie filter 1202a can be modified to filter out all dishes with calorie counts greater than 1570 calories.

Figure 13A:
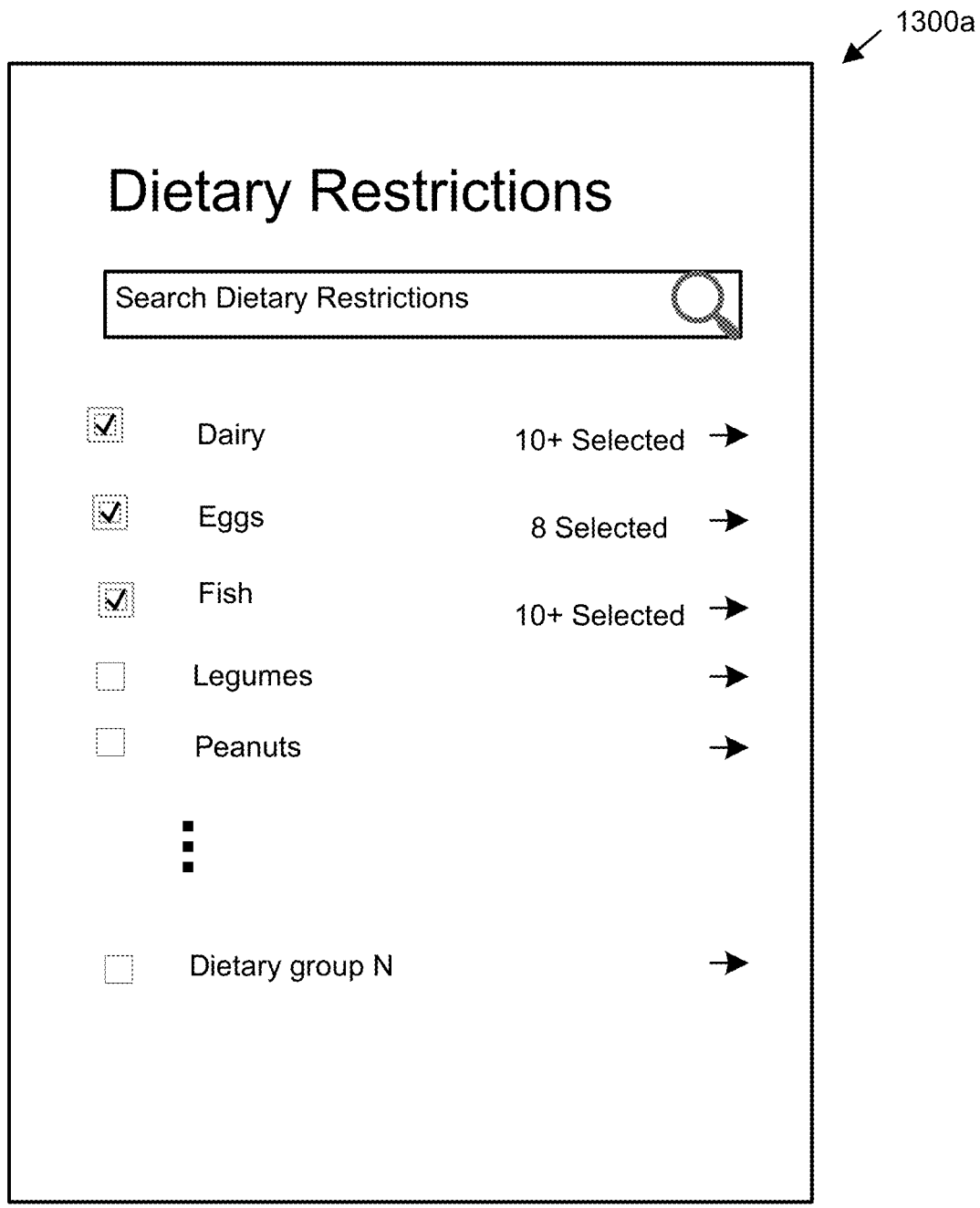
FIG. 13A is an example of a nineteenth GUI for selecting dietary restrictions, consistent with various embodiments.

FIG. 13A is an example of a nineteenth GUI 1300a for selecting dietary restrictions, consistent with various embodiments. As shown in FIG. 13A, various dietary restriction types (e.g., dairy, eggs, fish, legumes, peanuts, dietary group N) can be modified for the user to identify ingredients that the user would like to restrict from their diet. For example, the user can select various dairy-based ingredients in a dairy dietary type as dietary restrictions. This can be used to filter dishes that include ingredients restricted in the dietary restrictions.

Dietary restrictions can be grouped into main categories (e.g., fish, eggs, dairy) and subcategories (e.g., ingredients in each main category. For instance, upon selecting a "dairy" main category, all forms of cheese that include dairy can highlight red for a dish.

Figure 13B:
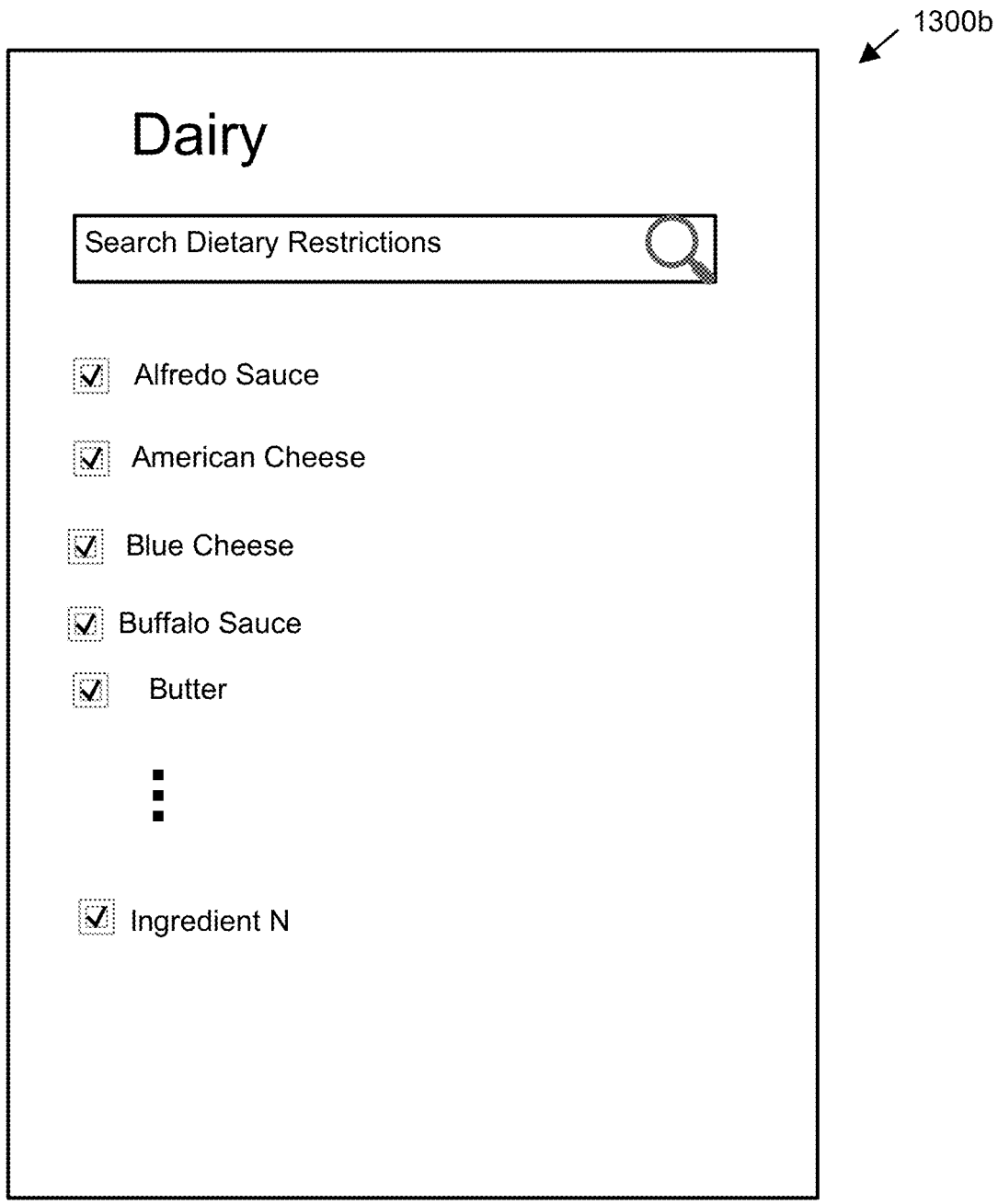
FIG. 13B is an example of a twentieth GUI for selecting dairy-based dietary restrictions, consistent with various embodiments.

FIG. 13B is an example of a twentieth GUI 1300b for selecting dairy-based dietary restrictions, consistent with various embodiments. As shown in FIG. 13B, various dairy-based ingredients (e.g., alfredo sauce, American cheese, blue cheese, buffalo sauce, butter, ingredient N) can be selected by the user as restricted ingredients.

Figure 14:
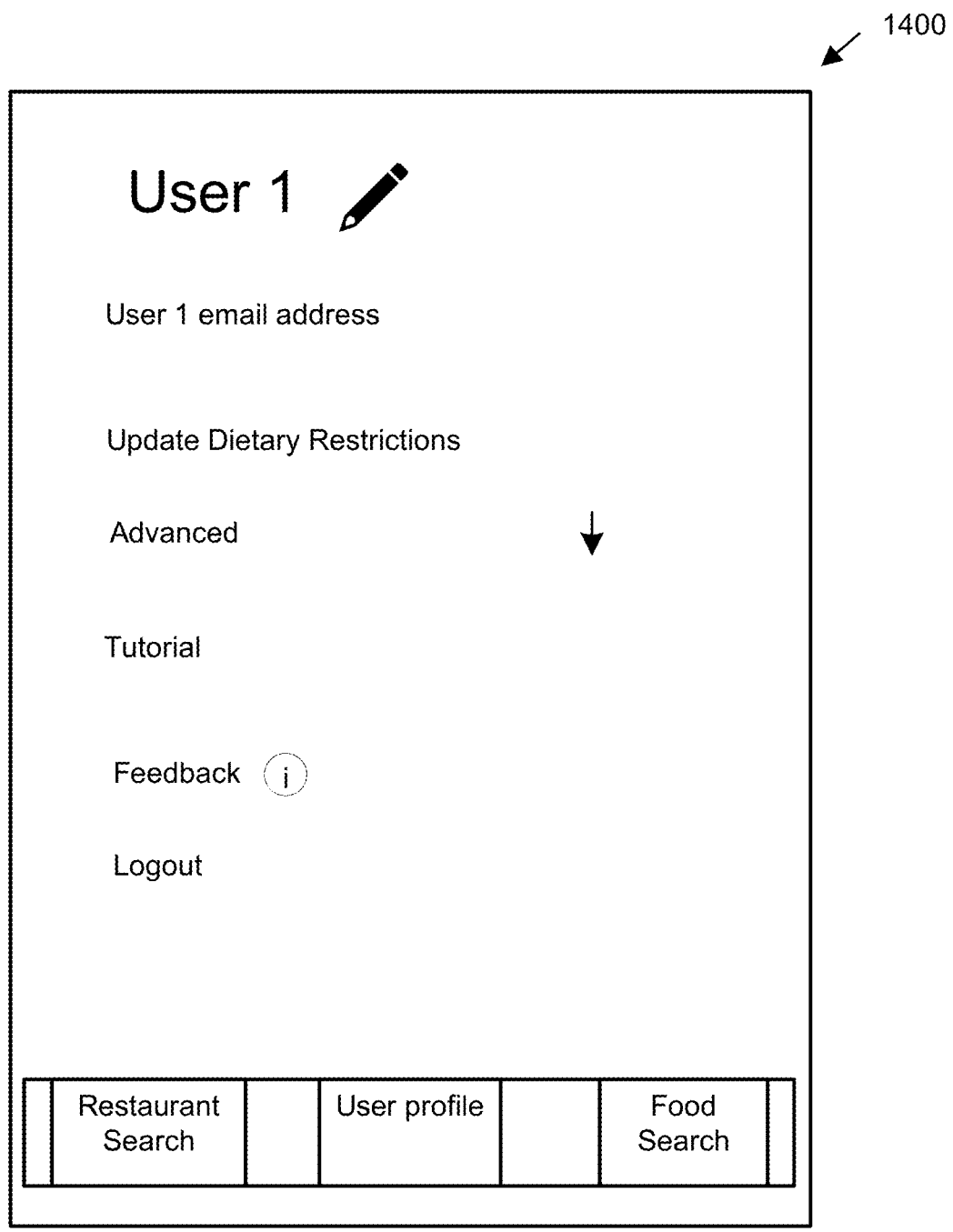
FIG. 14 is an example of a twenty-first GUI for updating a user profile, consistent with various embodiments.

FIG. 14 is an example of a twenty-first GUI 1400 for updating a user profile, consistent with various embodiments. As shown in FIG. 14, various aspects of the user profile can be updated. For instance, a username, a user email address, dietary restrictions, advanced settings, etc. can be updated. A tutorial of how to manage settings and operate the application can be provided upon selection of a tutorial button. The user can provide feedback on the application upon selecting a feedback button. The user can also logout via logout button.

Figure 15:
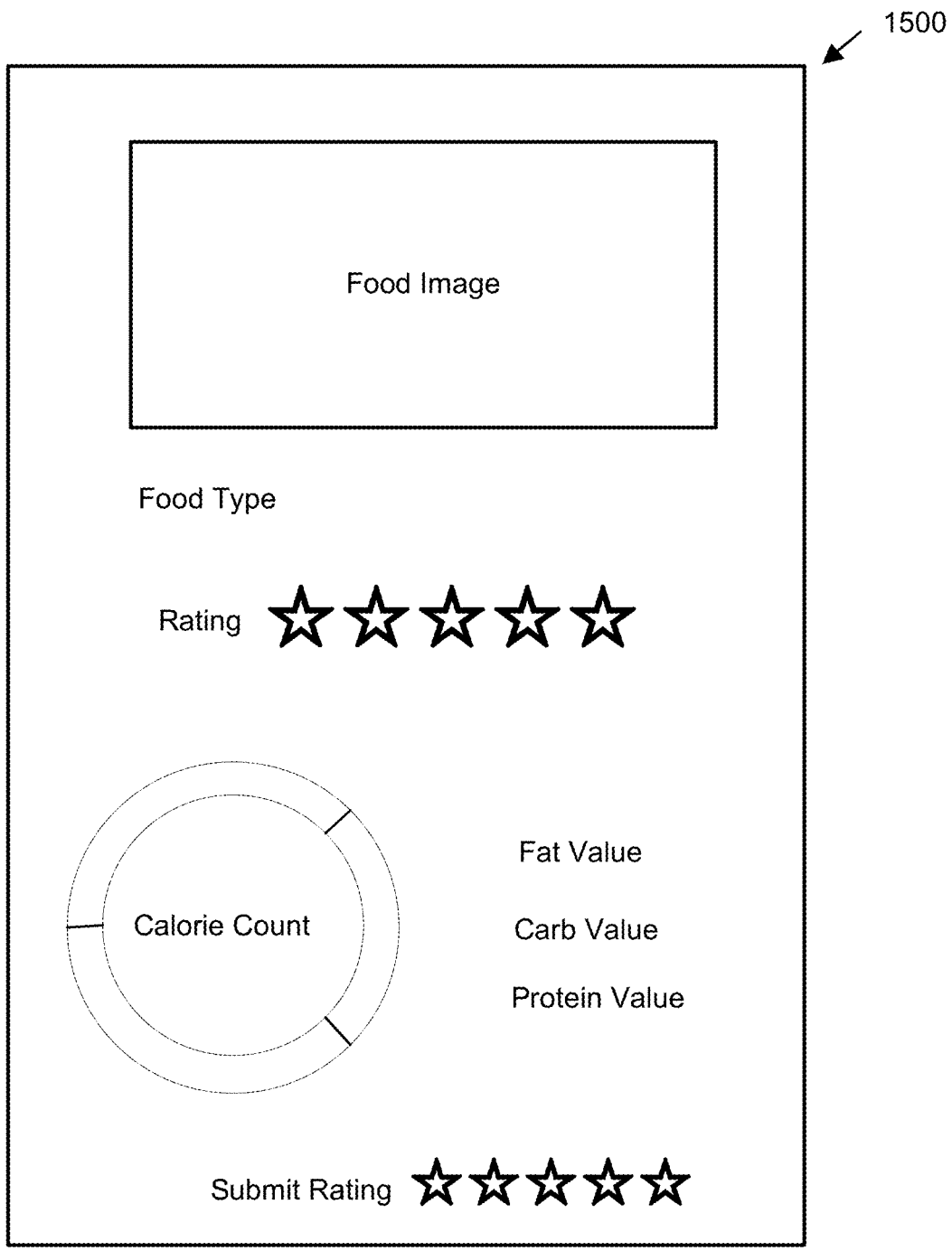
FIG. 15 is an example of a twenty-second GUI displaying a food dish and associated nutrition information, consistent with various embodiments.

FIG. 15 is an example of a twenty-second GUI 1500 displaying a food dish and associated nutrition information, consistent with various embodiments. As shown in FIG. 15, a food image can be displayed along with a food type describing the food and a rating of the food.

The twenty-second GUI 1500 can include a nutrition information display. This can include a representation of the nutritional information for the dish. For example, a chart can graphically display a calorie count, fat value, carb value, protein value, etc. The nutritional information can be provided by the restaurant or dynamically calculated based on known ingredient and portion information for the dish. The user can provide a rating to the dish via a submit rating icon.

Figure 16:
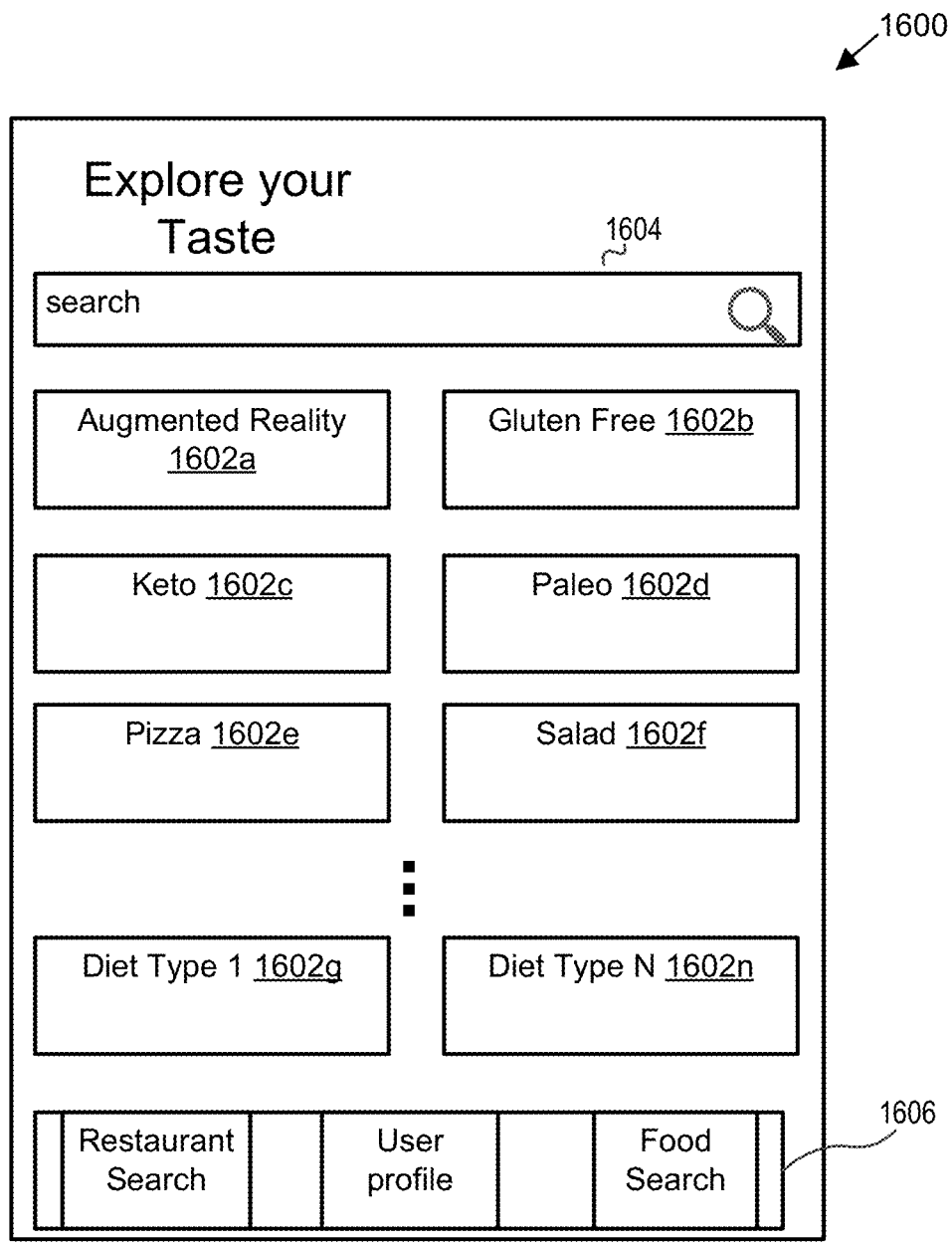
FIG. 16 is an example of a twenty-third GUI searching dietary-based food dishes, consistent with various embodiments.

FIG. 16 is an example of a twenty-third GUI 1600 searching dietary-based food dishes, consistent with various embodiments. As shown in FIG. 16, a user can search for food dishes based on various diet types. For example, the user can search by augmented reality 1602a, gluten free 1602b, keto 1602c, paleo 1602d, pizza 1602e, salad 1602f, diet type 1 1602g, diet type N 1602n, etc. The user can select a diet type and retrieve a series of search results that correspond to the diet type. The GUI 1600 can include a bottom bar 1606 that includes a restaurant search icon, user profile icon, food search icon, etc.

Figure 17:
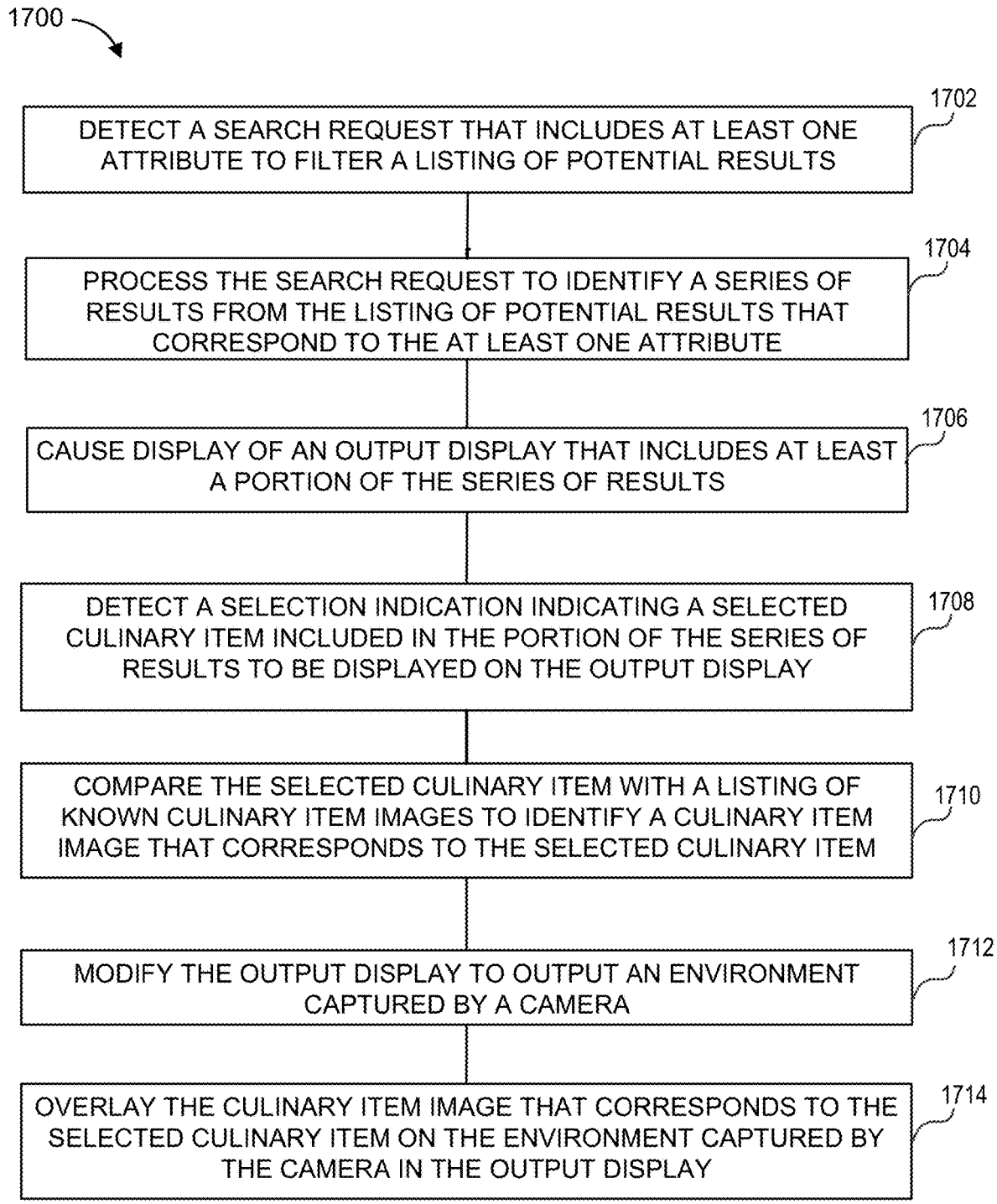
FIG. 17 is a block diagram of an example method for generating search results for a series of culinary items and generating a modified output display to display a selected culinary item, consistent with various embodiments.

FIG. 17 is a block diagram of an example method 1700 for generating search results for a series of culinary items and generating a modified output display to display a selected culinary item, consistent with various embodiments. The method may include detecting a search request that includes at least one attribute to filter a listing of potential results (block 1702). The search request can include a request to identify culinary items with attributes that correspond to attributes that filter a listing of potential results. The listing of potential results can include an overall listing of all dishes capable of being provided to a user as a search result, where each dish includes associated information (e.g., restaurant, food type, ingredients listing, etc.). In some cases, the search request can be a search for restaurants, dishes that correspond with a specific diet, dishes that do not include any allergen ingredients, etc. As an example, a search request can be for "pizza."

The attribute can include any feature capable of filtering a listing of potential results to a subset of results. For example, an attribute can filter a nutritional value of dishes, geographic locations of restaurants, food type of a dish, allergen inclusion in a dish, etc.

In some embodiments, the attribute to filter the listing of potential results in the search request includes any of a geographic location of potential providers of culinary items, a class of potential culinary items, a class of potential providers of culinary items, a price associated with potential culinary items, a range of nutritional values for potential culinary items, and a dietary restriction attribute for potential culinary items.

In some embodiments, the method includes comparing identified ingredients for each culinary item in the series of results with a listing of known allergens to identify a number of allergen ingredients in any culinary item in the series of results. The method can also include modifying the output display to include an allergen indication for any culinary item in the series of results that includes allergen ingredients.

The method may include processing the search request to identify a series of results from the listing of potential results that correspond to the at least one attribute (block 1704). Each of the series of results can be representative of a culinary item or a provider of the culinary item. Processing the search request can include comparing information associated with each entry in a listing of potential results with the attribute to identify a subset of entries comprising the series of results that are in accordance with the attribute. The series of results can also correspond with any user preferences (e.g., dietary restrictions, allergens) associated with the user. As an example, in response to a search request for pizza, the series of responses can include pizza dishes from various restaurants.

In some embodiments, the method includes identifying a series user-specific attributes that includes at least a user-specific dietary restricted ingredient. The method may also include identifying any of the number of allergen ingredients in any culinary item in the series of results that correspond to the user-specific dietary restricted ingredient. The output display can be modified to include the allergen indication to any culinary item that includes an ingredient corresponding to the user-specific dietary restricted ingredient.

In some embodiments, the method includes comparing identified ingredients for each culinary item in the series of results with a listing of nutritional information to derive nutritional information for each identified ingredient. The method can include, for each culinary item, aggregating nutritional information for each ingredient for the culinary item. The method can also include modifying the output display to include a nutritional profile for each culinary item that includes the aggregated nutritional information for each ingredient for each culinary item.

The method may include causing display of an output display that includes at least a portion of the series of results (block 1706). The output display can include a display screen on an electronic device, such as a mobile phone, computer, tablet, wearable device, etc. The series of results can be provided in a listing of results that is sorted by various features (e.g., average star rating, closest proximity, most relevant, preferred results first). As an example, a series of pizza dishes included in the series of results can be displayed, the dishes sorted by average star rating of each dish.

In some embodiments, the method includes comparing a description of each culinary item in the series of results with a listing of known ingredients to identify a series of ingredients for each culinary item in the series of results. This can include identifying all ingredients for each selected culinary item. The method can also include modifying the output display to include an indication of the series of ingredients for the portion of the series of results.

The method may include detecting a selection indication indicating a selected culinary item included in the portion of the series of results to be displayed on the output display (block 1708). This can include the user selecting a dish to be portrayed on the display as a 3D image. For instance, a first pizza dish selected on a touch screen on a user device can be identified based on the selection by the user.

The method may include comparing the selected culinary item with a listing of known culinary item images to identify a culinary item image that corresponds to the selected culinary item (block 1710). In other words, an image depicting the culinary item can be retrieved. This can include identifying an image that corresponds to the selected culinary item or identifying a stock image that corresponds to the type of food included in the selected culinary item.

The method may include modifying the output display to output an environment captured by a camera (block 1712). This can include capturing an environment (e.g., a surface) captured by a camera on a mobile phone of the user device.

In some embodiments, the method includes inspect the environment captured by the camera to detect a surface depicted in the environment. The method can also include identifying a gradient of the detected surface depicted in the environment. The method can also include determining whether the gradient of the detected surface depicted in the environment falls below a threshold gradient. The culinary item image that corresponds to the selected culinary item can be overlayed on the environment captured by the camera in the output display responsive to determining that the gradient of the detected surface depicted in the environment falls below the threshold gradient.

In some embodiments, the method includes, responsive to determining whether the gradient of the detected surface depicted in the environment does not fall below the threshold gradient, determining a rotational position to decrease the gradient of the detected surface depicted in the environment. The method can also include modifying the output display to include an instruction to reposition the camera according to the determined rotational position.

The method may include overlaying the culinary item image that corresponds to the selected culinary item on the environment captured by the camera in the output display (block 1714). This can include virtually placing a 3-D image of the selected culinary item on a detected surface captured by the camera.

In some embodiments, the method includes comparing a first series of culinary items associated with a first culinary item provider with the listing of known ingredients to identify a first set of ingredients of each of the first series of culinary items. The method can also include determining whether all ingredients associated with the selected culinary item is included in the first set of ingredients of each of the first series of culinary items. Responsive to determining that all ingredients associated with the selected culinary item is included in the first set of ingredients, the method can include transmitting a culinary item recommendation to a device associated with the first culinary item provider indicating a recommendation to add the selected culinary item in the first series of culinary items associated with the first culinary item provider. This can allow a restaurant to identify new dishes to provide to clients that comprise ingredients already obtained by the restaurant.

In some embodiments, the method includes, for each selected culinary item, storing the selected culinary item by type of culinary item. The method may include determining whether a number of stored selected culinary items of a first type exceeds a threshold value. The method may also include, responsive to determining that the number of stored selected culinary items of the first type exceeds the threshold value, generating a culinary item recommendation to a set of providers of culinary items providing a recommendation to provide the selected culinary items of the first type.

Example Processing System

Figure 18:
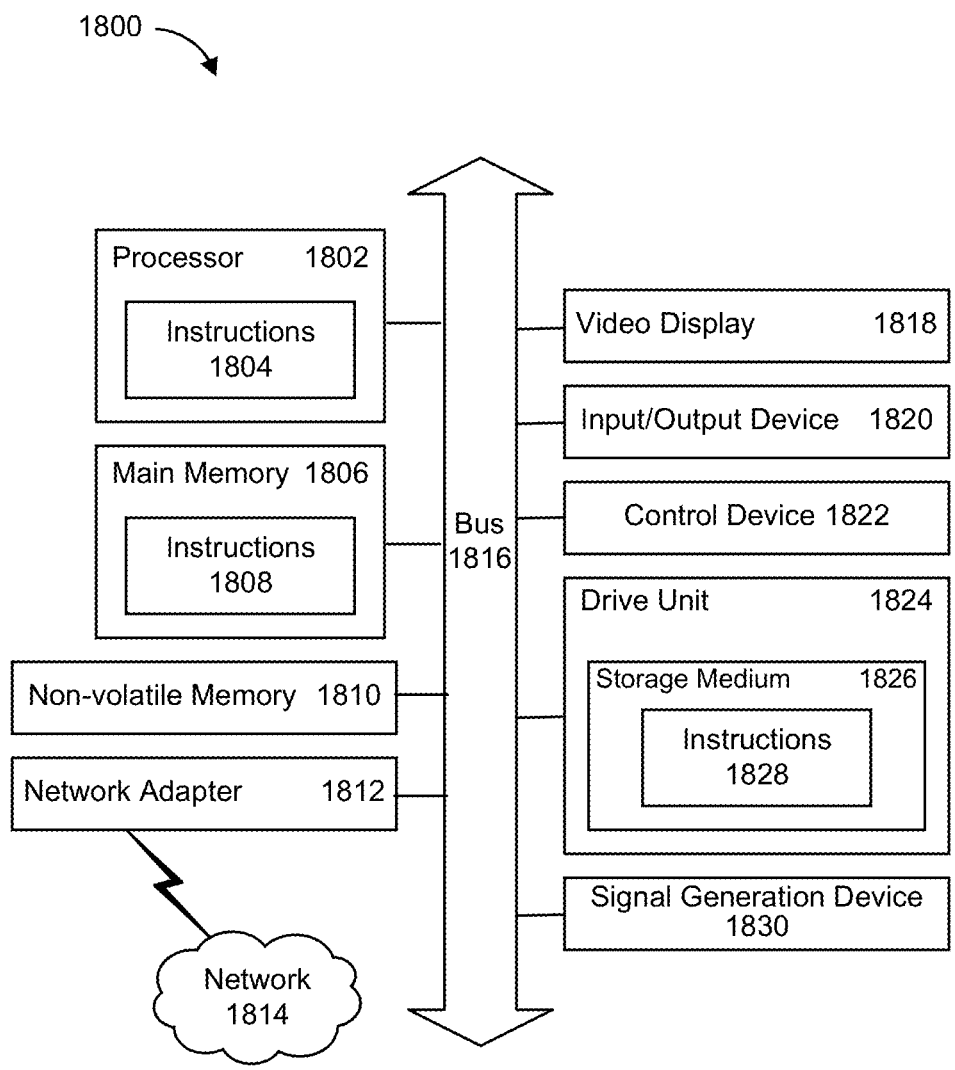
FIG. 18 is a block diagram illustrating an example of a processing system in which at least some operations described herein can be implemented.

FIG. 18 is a block diagram illustrating an example of a processing system 1800 in which at least some operations described herein can be implemented. As shown in FIG. 18, the processing system 1800 may include one or more central processing units ("processors") 1802, main memory 1806, non-volatile memory 1810, network adapter 1812 (e.g., network interfaces), video display 1818, input/output devices 1820, control device 1822 (e.g., keyboard and pointing devices), drive unit 1824 including a storage medium 1826, and signal generation device 1830 that are communicatively connected to a bus 1816. The bus 1816 is illustrated as an abstraction that represents any one or more separate physical buses, point to point connections, or both connected by appropriate bridges, adapters, or controllers. The bus 1816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1800 operates as part of a user device, although the processing system 1800 may also be connected (e.g., wired or wirelessly) to the user device. In a networked deployment, the processing system 1800 may operate in the capacity of a server or a client machine in a client-server network environment, or as a peer machine in a peer-to-peer (or distributed) network environment.

The processing system 1800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 1800.

While the main memory 1806, non-volatile memory 1810, and storage medium 1826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1804, 1808, 1828) set at various times in various memory and storage devices in a computer, and that, when read and executed by one or more processing units or processors 1802, cause the processing system 1800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 1810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1812 enables the processing system 1800 to mediate data in a network 1814 with an entity that is external to the processing system 1800 through any known and/or convenient communications protocol supported by the processing system 1800 and the external entity. The network adapter 1812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for generating search results for a series of culinary items and generating a modified output display to display a selected culinary item, the computer-implemented method comprising:
    detecting a search request that includes at least one attribute to filter a listing of potential results;
    processing the search request to identify a series of results from the listing of potential results that correspond to the at least one attribute, each of the series of results representative of a culinary item or a provider of the culinary item;
    causing display of an output display that includes at least a portion of the series of results;
    detecting a selection indication indicating a selected culinary item included in the portion of the series of results to be displayed on the output display;
    comparing the selected culinary item with a listing of known culinary item images to identify a culinary item image that corresponds to the selected culinary item;
    modifying the output display to output an environment captured by a camera; and
    overlaying the culinary item image that corresponds to the selected culinary item on the environment captured by the camera in the output display.

2. The computer-implemented method of claim 1, further comprising:
    comparing a description of each culinary item in the series of results with a listing of known ingredients to identify a series of ingredients for each culinary item in the series of results;
    modifying the output display to include an indication of the series of ingredients for the portion of the series of results.

3. The computer-implemented method of claim 2, further comprising:
    comparing a first series of culinary items associated with a first culinary item provider with the listing of known ingredients to identify a first set of ingredients of each of the first series of culinary items;
    determining whether all ingredients associated with the selected culinary item is included in the first set of ingredients of each of the first series of culinary items; and
    responsive to determining that all ingredients associated with the selected culinary item is included in the first set of ingredients, transmitting a culinary item recommendation to a device associated with the first culinary item provider indicating a recommendation to add the selected culinary item in the first series of culinary items associated with the first culinary item provider.

4. The computer-implemented method of claim 2, further comprising:
    comparing identified ingredients for each culinary item in the series of results with a listing of known allergens to identify a number of allergen ingredients in any culinary item in the series of results; and
    modifying the output display to include an allergen indication for any culinary item in the series of results that includes allergen ingredients.

5. The computer-implemented method of claim 4, further comprising:
    identifying a series user-specific attributes that includes at least a user-specific dietary restricted ingredient;
    identifying any of the number of allergen ingredients in any culinary item in the series of results that correspond to the user-specific dietary restricted ingredient, wherein the output display is modified to include the allergen indication to any culinary item that includes an ingredient corresponding to the user-specific dietary restricted ingredient.

6. The computer-implemented method of claim 2, further comprising:
comparing identified ingredients for each culinary item in the series of results with a listing of nutritional information to derive nutritional information for each identified ingredient;
for each culinary item, aggregating nutritional information for each ingredient for the culinary item; and
modifying the output display to include a nutritional profile for each culinary item that includes the aggregated nutritional information for each ingredient for each culinary item.

7. The computer-implemented method of claim 1, further comprising:
for each selected culinary item, storing the selected culinary item by type of culinary item;
determining whether a number of stored selected culinary items of a first type exceeds a threshold value; and
responsive to determining that the number of stored selected culinary items of the first type exceeds the threshold value, generating a culinary item recommendation to a set of providers of culinary items providing a recommendation to provide the selected culinary items of the first type.

8. The computer-implemented method of claim 1, wherein the attribute to filter the listing of potential results in the search request includes any of a geographic location of potential providers of culinary items, a class of potential culinary items, a class of potential providers of culinary items, a price associated with potential culinary items, a range of nutritional values for potential culinary items, and a dietary restriction attribute for potential culinary items.

9. The computer-implemented method of claim 1, further comprising:
inspect the environment captured by the camera to detect a surface depicted in the environment;
identifying a gradient of the detected surface depicted in the environment; and
determining whether the gradient of the detected surface depicted in the environment falls below a threshold gradient, wherein the culinary item image that corresponds to the selected culinary item is overlayed on the environment captured by the camera in the output display responsive to determining that the gradient of the detected surface depicted in the environment falls below the threshold gradient.

10. The computer-implemented method of claim 8, further comprising:
responsive to determining whether the gradient of the detected surface depicted in the environment does not fall below the threshold gradient, determining a rotational position to decrease the gradient of the detected surface depicted in the environment; and
modifying the output display to include an instruction to reposition the camera according to the determined rotational position.

11. A method comprising:
receiving a search request that includes at least one attribute to filter a listing of potential search results;
processing the search request to identify a series of items from the listing of potential search results that correspond to the at least one attribute;
causing display of an output display of a user device that includes the series of items;
detecting a selection indication indicating a selected item included in the series of items;
causing display of an environment captured by a camera of the user device; and
overlaying an image of the selected item on the environment captured by the camera in the output display.

12. The method of claim 11, further comprising:
comparing a description of each item in the series of results with a listing of known ingredients to identify a series of ingredients for each item in the series of results, each item including a culinary item; and
modifying the output display to include an indication of the series of ingredients for the portion of the series of results.

13. The method of claim 12, further comprising:
comparing a first series of culinary items associated with a first culinary item provider with the listing of known ingredients to identify a first set of ingredients of each of the first series of culinary items;
determining whether all ingredients associated with the selected culinary item is included in the first set of ingredients of each of the first series of culinary items; and
responsive to determining that all ingredients associated with the selected culinary item is included in the first set of ingredients, transmitting a culinary item recommendation to a device associated with the first culinary item provider indicating a recommendation to add the selected culinary item in the first series of culinary items associated with the first culinary item provider.

14. The method of claim 12, further comprising:
comparing identified ingredients for each culinary item in the series of results with a listing of known allergens to identify a number of allergen ingredients in any culinary item in the series of results; and
modifying the output display to include an allergen indication for any culinary item in the series of results that includes allergen ingredients.

15. The method of claim 12, further comprising:
comparing identified ingredients for each culinary item in the series of results with a listing of nutritional information to derive nutritional information for each identified ingredient;
for each culinary item, aggregating nutritional information for each ingredient for the culinary item; and
modifying the output display to include a nutritional profile for each culinary item that includes the aggregated nutritional information for each ingredient for each culinary item.

16. The method of claim 11, further comprising:
inspect the environment captured by the camera to detect a surface depicted in the environment;
identifying a gradient of the detected surface depicted in the environment; and
determining whether the gradient of the detected surface depicted in the environment falls below a threshold gradient, wherein the image that corresponds to the selected item is overlayed on the environment captured by the camera in the output display responsive to determining that the gradient of the detected surface depicted in the environment falls below the threshold gradient.

17. The method of claim 16, further comprising:
responsive to determining whether the gradient of the detected surface depicted in the environment does not fall below the threshold gradient, determining a rotational position to decrease the gradient of the detected surface depicted in the environment; and modifying the output display to include an instruction to reposition the camera according to the determined rotational position.

18. A tangible, non-transient computer-readable medium having instructions stored thereon that, when executed by a processor, cause the processor to:

obtain a search request from a client device that includes at least one attribute to filter a listing of potential results;

process the search request to identify a series of results from the listing of potential results that correspond to the at least one attribute, each of the series of results representative of a culinary item or a provider of the culinary item;

cause display of an output display on the client device that includes at least a portion of the series of results;

obtain a selection indication indicating a selected culinary item included in the portion of the series of results to be displayed on the output display;

compare the selected culinary item with a listing of known culinary item images to identify a culinary item image that corresponds to the selected culinary item;

modify the output display to output an environment captured by a camera of the client device;

inspect the environment captured by the camera to detect a surface depicted in the environment;

identify a gradient of the detected surface depicted in the environment;

determine whether the gradient of the detected surface depicted in the environment falls below a threshold gradient; and overlay the culinary item image that corresponds to the selected culinary item on the environment captured by the camera in the output display responsive to determining that the gradient of the detected surface depicted in the environment falls below the threshold gradient.

19. The computer-readable medium of claim 18, further causing the processor to:

compare a description of each culinary item in the series of results with a listing of known ingredients to identify a series of ingredients for each culinary item in the series of results; and modify the output display to include an indication of the series of ingredients for the portion of the series of results.

20. The computer-readable medium of claim 19, further causing the processor to:

compare a first series of culinary items associated with a first culinary item provider with the listing of known ingredients to identify a first set of ingredients of each of the first series of culinary items;

determine whether all ingredients associated with the selected culinary item is included in the first set of ingredients of each of the first series of culinary items; and responsive to determining that all ingredients associated with the selected culinary item is included in the first set of ingredients, transmit a culinary item recommendation to a device associated with the first culinary item provider indicating a recommendation to add the selected culinary item in the first series of culinary items associated with the first culinary item provider.

21. The computer-readable medium of claim 18, further causing the processor to:

responsive to determining whether the gradient of the detected surface depicted in the environment does not fall below the threshold gradient, determine a rotational position to decrease the gradient of the detected surface depicted in the environment; and modify the output display to include an instruction to reposition the camera according to the determined rotational position.

22. The computer-readable medium of claim 19, further causing the processor to:

identify a series user-specific attributes that includes at least a user-specific dietary restricted ingredient; and identify any of the number of allergen ingredients in any culinary item in the series of results that correspond to the user-specific dietary restricted ingredient, wherein the output display is modified to include the allergen indication to any culinary item that includes an ingredient corresponding to the user-specific dietary restricted ingredient.

23. The computer-readable medium of claim 19, further causing the processor to:

compare identified ingredients for each culinary item in the series of results with a listing of nutritional information to derive nutritional information for each identified ingredient;

for each culinary item, aggregate nutritional information for each ingredient for the culinary item; and modify the output display to include a nutritional profile for each culinary item that includes the aggregated nutritional information for each ingredient for each culinary item.

24. The computer-readable medium of claim 18, further causing the processor to:

for each selected culinary item, store the selected culinary item by type of culinary item;

determine whether a number of stored selected culinary items of a first type exceeds a threshold value; and responsive to determining that the number of stored selected culinary items of the first type exceeds the threshold value, generate a culinary item recommendation to a set of providers of culinary items providing a recommendation to provide the selected culinary items of the first type.

25. The computer-readable medium of claim 18, wherein the attribute to filter the listing of potential results in the search request includes any of a geographic location of potential providers of culinary items, a class of potential culinary items, a class of potential providers of culinary items, a price associated with potential culinary items, a range of nutritional values for potential culinary items, and a dietary restriction attribute for potential culinary items.

* * * * *